(12) United States Patent
Ingale et al.

(10) Patent No.: US 12,335,894 B2
(45) Date of Patent: Jun. 17, 2025

(54) METHOD FOR OPERATING UE COMPRISING PLURALITY OF SIMS IN WIRELESS COMMUNICATION SYSTEM

(71) Applicant: Samsung Electronics Co., Ltd., Suwon-si (KR)

(72) Inventors: Mangesh Abhimanyu Ingale, Bangalore (IN); Lalit Kumar Pathak, Bangalore (IN); Lalith Kumar, Bangalore (IN); Mohanraja B, Bangalore (IN); Nikhil Patni, Bangalore (IN); Rohan Raj, Bangalore (IN); Tushar Vrind, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 17/632,654

(22) PCT Filed: Aug. 6, 2020

(86) PCT No.: PCT/KR2020/010415
§ 371 (c)(1),
(2) Date: Feb. 3, 2022

(87) PCT Pub. No.: WO2021/025491
PCT Pub. Date: Feb. 11, 2021

(65) Prior Publication Data
US 2022/0279469 A1   Sep. 1, 2022

(30) Foreign Application Priority Data

Aug. 8, 2019  (IN) .............................. 201941032226
Aug. 3, 2020  (IN) .............................. 2019 41032226

(51) Int. Cl.
*H04W 60/00*   (2009.01)
*H04W 76/30*   (2018.01)
*H04W 88/06*   (2009.01)

(52) U.S. Cl.
CPC ......... *H04W 60/005* (2013.01); *H04W 76/30* (2018.02); *H04W 88/06* (2013.01)

(58) Field of Classification Search
CPC .... H04W 60/005; H04W 76/30; H04W 88/06
See application file for complete search history.

(56) References Cited

U.S. PATENT DOCUMENTS 9,167,592 B1   10/2015  Hsu et al.
11,115,803 B2   9/2021  Zhang et al.
(Continued)

FOREIGN PATENT DOCUMENTS

CN   104272824 A   1/2015
CN   105657844 A   6/2016
(Continued)

OTHER PUBLICATIONS

Applicant Amended description with annotations mailed on Aug. 9, 2024 in respond to the European Office Action dated Apr. 11, 2024, for European Application No. EP 20849606 A filed on Aug. 6, 2020 (Year: 2024).*
(Continued)

*Primary Examiner* — Nader Bolourchi
(74) *Attorney, Agent, or Firm* — Jefferson IP Law, LLP

(57) ABSTRACT

A method performed by a UE comprising a plurality of subscriber identity modules (SIMs) is provided. The method includes registering a first SIM from the plurality of SIMs with a first network entity, transmitting, to the first network entity, a request message to obtain a time gap configuration when the UE is registered and connected with the first network entity through the first SIM, receiving, from the first
(Continued)

network entity, a response message including the time gap configuration, and activating the time gap configuration in case that the UE is connected to the first network entity.

6 Claims, 15 Drawing Sheets

(56) References Cited

U.S. PATENT DOCUMENTS

| | | |
|---|---|---|
| 2013/0150036 A1 | 6/2013 | Pattaswamy et al. |
| 2013/0303240 A1 | 11/2013 | Sanka et al. |
| 2014/0220981 A1 | 8/2014 | Jheng et al. |
| 2016/0095159 A1 | 3/2016 | Su |
| 2016/0381710 A1 | 12/2016 | Bansal et al. |
| 2018/0077728 A1 | 3/2018 | Shi et al. |
| 2018/0160422 A1 | 6/2018 | Pathak et al. |
| 2018/0359284 A1 | 12/2018 | Kotreka et al. |
| 2018/0368099 A1 | 12/2018 | Chen et al. |
| 2019/0124575 A1 | 4/2019 | Long et al. |

FOREIGN PATENT DOCUMENTS

| | | |
|---|---|---|
| CN | 109691219 A | 4/2019 |
| CN | 109788494 A | 5/2019 |
| IN | 201941031238 A | 2/2021 |

OTHER PUBLICATIONS

Applicant Amended claims with annotations mailed on Aug. 9, 2024 in respond to the European Office Action dated Apr. 11, 2024, for European Application No. EP 20849606 A filed on Aug. 6, 2020 (Year: 2024).*

Indian Office Action dated Nov. 17, 2021, issued in Indian Patent Application No. 201941032226.

Chinese Office Action dated Oct. 11, 2023, issued in Chinese Application No. 202080056345.2.

Extended European Search Report dated Jun. 29, 2022, issued in European Patent Application No. 20849606.7.

European Office Action dated Apr. 11, 2024, issued in European Application No. 20 849 606.7-1218.

* cited by examiner

METHOD FOR OPERATING UE COMPRISING PLURALITY OF SIMS IN WIRELESS COMMUNICATION SYSTEM

TECHNICAL FIELD

The present disclosure relates to a wireless communication system, and more specifically related to a method and User Equipment (UE) for managing connection of a first subscriber identity module (SIM) and a second SIM in the wireless communication system by configuring a gap event on the first SIM or the second SIM of the UE at a predefined duration. The present application is based on, and claims priority from an Indian Application Number 201941032226 filed on 8 Aug. 2019 the disclosure of which is hereby incorporated by reference herein.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. In 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the last few decades several broadband wireless technologies have been developed to meet the growing number of broadband subscribers and to provide more and better applications and services. A second generation wireless communication system has been developed to provide voice services while ensuring the mobility of users. A third generation (3G) wireless communication system supports not only the voice service but also a data service. In recent years, a fourth generation wireless communication system has been developed to provide high-speed data service. However, currently, the fourth generation wireless communication system suffers from lack of resources to meet the growing demand for high speed data services, so that a fifth generation wireless communication system is being developed to meet the growing demand for high speed data services, support ultra-reliability, and low latency applications.

The fifth generation wireless communication system will be deployed not only in lower frequency bands e.g. 500 MHz to 10 GHz bands, but also in higher frequency (mm-Wave) bands, e.g., 10 GHz to 100 GHz bands, so as to accomplish higher data rates. In order to mitigate propagation loss of radio waves and increase the transmission distance, a beamforming, massive Multiple-Input Multiple-Output (MIMO), Full Dimensional MIMO (FD-MIMO), array antenna, an analog beam forming, large scale antenna techniques are being considered in a design of the fifth generation wireless communication system. In addition, the fifth generation wireless communication system is expected to address different use cases having quite different requirements in terms of data rate, latency, reliability, mobility etc. However, the design of an air-interface of the fifth generation wireless communication system would be flexible enough to serve UEs having quite different capabilities depending on the use case and market segment the UE cater service to an end customer.

Further, for few example use cases, the fifth generation wireless communication system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

DISCLOSURE OF INVENTION

Technical Problem

In the fourth generation wireless communication system like Long-Term Evolution LTE, there are devices which have Multi Universal Subscriber Identity Module (M-USIM) capability, particularly dual SIM devices have proliferated over the past decade. An operation of the dual SIM devices is transparent to a network and certain procedures like paging monitoring and responding to paging, measurements, system information acquisition etc. are currently handled in implementation specific way. In other words, there is no standard support for efficiently handling the aforementioned procedures. This has resulted not only in degrading of user experience in terms of loss of data throughput but also wastage of network resources. The dual SIM devices have different radio transmit-receive (RF Tx/Rx) capability and the implementation specific solutions to handle the aforementioned procedures are not same but depend on the RF capability of the dual SIM device. Depending on the RF Tx/Rx capability following types of dual SIM devices are available a) Dual SIM Dual Standby (DSDS) with single Tx/Rx RF capability, Dual SIM Dual Receive (DSDR) with single Tx and dual Rx RF capability and Dual SIM Dual Active (DSDA) with dual Tx/Rx RF capability.

The terms "dual SIM device" "MUSIM UE" or "MUSIM device" are used interchangeable throughout the disclosure which refers to a device comprising the plurality of SIMs. The dual SIM device is required to monitor the paging occasion and other time critical occasions such as essential System Information Blocks (SIBs), Cell Broadcast Information, Multimedia Broadcast Multicast Services (MBMS) and the like, on the respective system (network) associated with each Universal Subscriber Identity Module (USIM). In general, system with each USIM independently decides these occasions. The paging occasion of one USIM may collide with paging and other time critical occasions of other USIMs. These collisions are handled in a specific manner according to UE implementations as there is no standard mechanism devised for MUSIM UE from the 3GPP standardization perspective. Therefore, this may sometime result in missing of the paging or time critical occasions for handling of paging collisions for MUSIM devices. Recently, there is discussion within the 3GPP standardization to specify enablers to handle the aforementioned procedures regardless of the UE RF capability. This would be applicable to LTE system connected to an Evolved Packet Core (EPC) and a New radio (NR) system connected to a fifth generation core (5GC). In an example, the UE may support dual SIM capability associated with a Global communication system for mobile (GSM)+GSM, GSM+LTE, LTE+LTE, LTE+ Voice Over (LTE) (VoLTE), VoLTE+VoLTE, VoLTE+NR, LTE+NR, NR+NR so on and so forth.

Thus, it is desired to address the above mentioned disadvantages or other shortcomings or at least provide a useful alternative.

Solution to Problem

The principal object of the embodiments herein is to provide a method for managing connection of a first SIM and a second SIM of a UE by efficiently achieving handling of a paging procedure, system information acquisition, managing data sessions regardless of a Tx/Rx capability. This results in increasing the user experience in terms of data throughput but also reducing wastage of network resources.

Accordingly, embodiments herein disclose a method for operating a UE comprising a plurality of SIMs in a wireless communication system. The method includes registering, by the UE, a first SIM from the plurality of SIMs with a first network entity in a wireless network and a second SIM from the plurality of SIMs with a second network entity in the wireless network. Further, the method includes sending, by the UE, a request message to obtain a time gap configuration from one of: the first network entity when the UE is registered and connected with the first network entity through the first SIM and to the second network entity when the UE is registered and connected to the second network entity through the second SIM. Further, the method includes receiving, by the UE, a response message comprising the time gap configuration from one of: the first network entity and the second network entity. Further, the method includes activating, by the UE, the time gap configuration when the UE is connected to one of: the first network entity and the second network entity.

In an embodiment, activating, by the UE, the time gap configuration includes detecting, by the UE, one of a time bound event and a non-time bound event on the second SIM registered with the second network entity, when the UE is connected to the first network entity through the first SIM, and activating, by the UE, the time gap configuration through one of: by notifying the first network entity and autonomously without notifying the first network entity.

In an embodiment, activating, by the UE (100), the time gap configuration comprises detecting, by the UE, one of a time bound event and a non-time bound event on the first SIM registered with the first network entity, when the UE is connected to the second network entity through the second SIM, and activating, by the UE, the time gap configuration through one of: by notifying the second network entity and autonomously without notifying the second network entity.

In an embodiment, the request message is a RRC message. The request message comprises at least one of: duration of the time gap configuration, a first indication to allow the UE to send notification to activate the time gap configuration, a second indication to allow autonomous activation of the time gap configuration, and a third indication indicating the time gap configuration is one of: one shot event or periodic event and if it is periodic event then the periodicity of the time gap.

In an embodiment, the response message is a RRC message. The response message comprises time gap configuration parameters including at least one of: a predefined timer value indicating duration of the allowed time gap, a first indication whether the UE is allowed to activate the time gap configuration by sending a notification to the first network entity or the second network entity, a second indication whether the UE is allowed to activate the configured time gap autonomously without the need to send a notification and a third indication whether the configured time gap is one shot event or a periodic event and if it is periodic event then the periodicity of the time gap. The UE is configured to store the timer value received in the response message and the received time gap configuration.

In an embodiment, the time gap configuration is activated, based on the first indication received in the response message, by notifying the network entity indicating a temporary suspension of a data session corresponding to a predefined time duration with the network entity, wherein the notification is one of: a MAC CE and a physical control signal, activating the time gap configuration by starting a timer associated with a stored value of the configured time gap duration, and retuning a radio frequency (RF) circuitry from one of: the first network entity if the UE is connected to the first network entity and the second network entity if the UE is connected to the second network entity.

In an embodiment, the time gap configuration is activated, based on the second indication received in the response message, by autonomously activating the time gap configuration by starting a timer associated with the stored value of the configured time gap duration, and retuning the RF circuitry from one of: the first network entity if the UE is connected to the first network entity and the second network entity if the UE is connected to the second network entity.

In an embodiment, further, the method includes detecting that the timer associated with time gap has expired. Further, the method includes indicating the network entity one of: request to resume the temporary suspension of the data session with the first network entity or the second network entity and request to release a connection with the first network entity or the second network entity to one of: IDLE state or INACTVE state in response to detecting that the timer associated with the time gap has expired.

In an embodiment, the temporary suspension of the data session is requested to be resumed by determining to retune the RF circuitry for the connection with one of: the first network entity if the UE was previously connected with the first network entity and with the second network entity if the UE was previously connected with the second network entity.

In an embodiment, the connection is requested to be released by determining to retune the RF circuitry for the connection with one of: the second network entity if the UE was previously connected with the first network entity and with the first network entity if the UE was previously connected with the second network entity.

In an embodiment, the time bound event is one of a paging occasion monitoring event and a system information reading event, a cell broadcast reception event and a reception of Multi-Media Broadcast Multicast Service (MBMS).

In an embodiment, the non-time bound event is one of: a Public Land Mobile Network (PLMN) search event and event for periodic TAU procedure and an event for measurements in IDLE state or INACTIVE state.

Accordingly, embodiments herein disclose a UE includes a processor coupled with a memory. The processor is configured to register a first SIM from a plurality of SIMs with a first network entity in a wireless network and a second SIM from the plurality of SIMs with a second network entity in the wireless network. Further, the processor is configured to send a request message to obtain a time gap configuration from one of: the first network entity when the UE is registered and connected with the first network entity through the first SIM and to the second network entity when the UE is registered and connected to the second network entity through the second SIM. Further, the processor is configured to receive a response message including the time gap configuration from one of: the first network entity and the second network entity. Further, the processor is configured to activate the time gap configuration when the UE is connected to one of: the first network entity and the second network entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to the technical solution of the present disclosure, the proposed method can be used to manage the connection of the first SIM and the second SIM of the UE by efficiently handling of a paging procedure, system information acquisition, managing data sessions regardless of a Tx/Rx capability. This results in increasing the user experience in terms of data throughput but also reducing wastage of network resources.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

Figure 1:
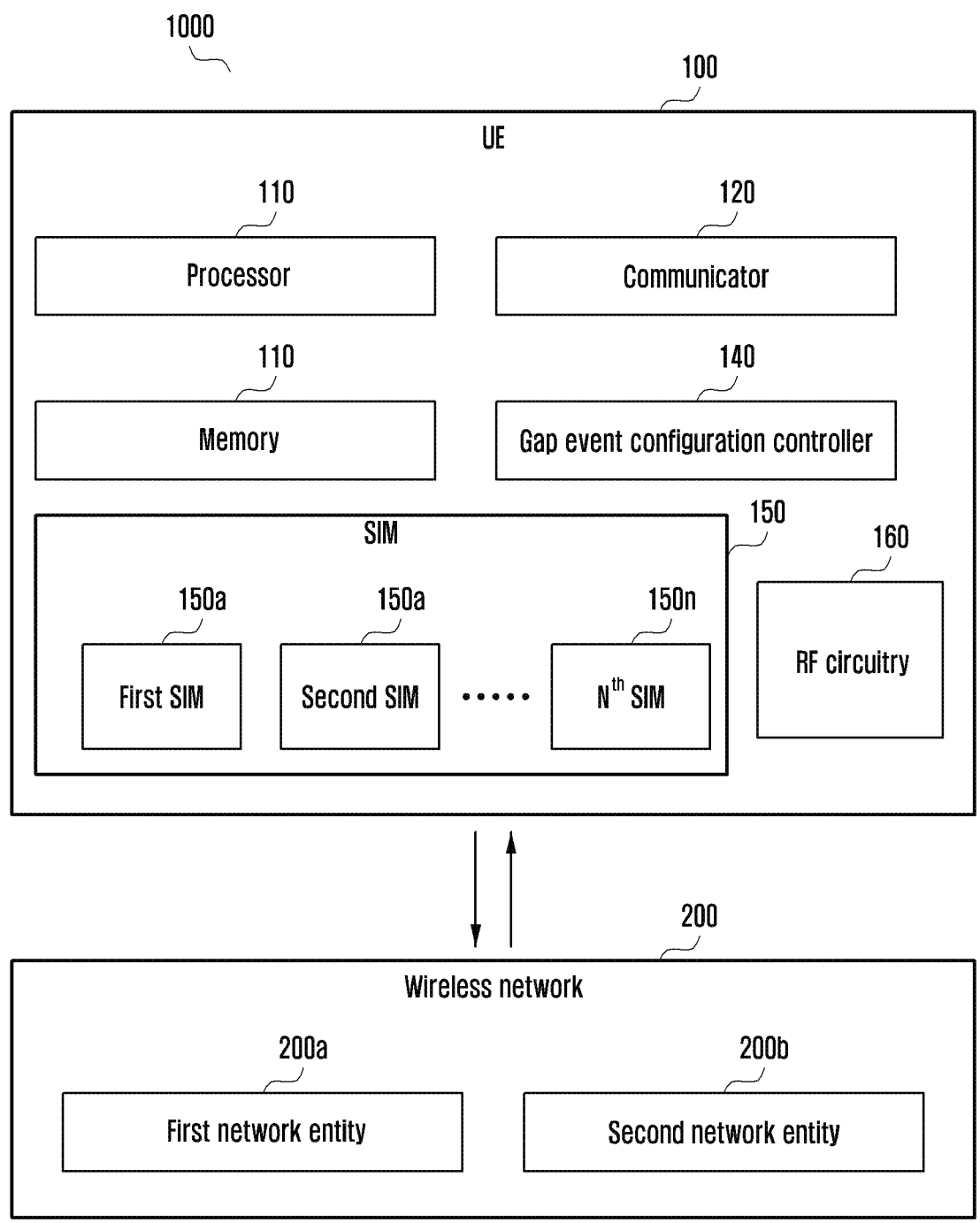
FIG. 1 illustrates various hardware components of a UE for managing connection of a first SIM and a second SIM in a wireless communication system, according to embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for operating a UE comprising a plurality of SIMs in a wireless communication system. The method includes registering, by the UE, a first SIM from the plurality of SIMs with a first network entity in a wireless network and a second SIM from the plurality of SIMs with a second network entity in the wireless network. Further, the method includes sending, by the UE, a request message to obtain a time gap configuration from one of: the first network entity when the UE is registered and connected with the first network entity through the first SIM and to the second network entity when the UE is registered and connected to the second network entity through the second SIM. Further, the method includes receiving, by the UE, a response message comprising the time gap configuration from one of: the first network entity and the second network entity. Further, the method includes activating the time gap configuration when the UE is connected to one of: the first network entity and the second network entity.

Unlike conventional methods and system, the proposed method can be used to manage the connection of the first SIM and the second SIM of the UE by efficiently handling of a paging procedure, system information acquisition, managing data sessions regardless of a Tx/Rx capability. This results in increasing the user experience in terms of data throughput but also reducing wastage of network resources.

Referring now to the drawings, and more particularly to FIGS. 1 through 7c, there are shown preferred embodiments.

FIG. 1 shows various hardware components of a UE (100) for managing the connection of a first SIM (150a) and a second SIM (150b) in a wireless communication system (1000). The wireless communication system (1000) includes the UE (100) and a wireless network (200). The UE (100) can be, for example, but not limited to a cellular phone, a smart phone, a Personal Digital Assistant (PDA), a tablet computer, a laptop computer, an Internet of Things (IoT), a virtual reality device and an immersive system.

The UE (100) includes a processor (110), a communicator (120), a memory (130), a gap event configuration controller (140), a plurality of SIMs (150) and a RF circuitry (160). The processor (110) is coupled with the communicator (120), the memory (130), the gap event configuration controller (140), the plurality of SIMs (150), and the RF circuitry (160). The wireless network (200) includes a first network entity (200a) and a second network entity (200b).

The processor (110) registers the first SIM (150a) with the first network entity (200a) and the second SIM (150b) with the second network entity (200b). After registering the first SIM (150a) with the first network entity (200a) and the second SIM (150b) with the second network entity (200b), the gap event configuration controller (140) is configured to send a request message to obtain a time gap configuration from one of: the first network entity (200a) when the UE (100) is registered and connected with the first network entity (200a) through the first SIM (150a) and to the second network entity (200b) when the UE (100) is registered and connected to the second network entity (200b) through the second SIM (150b). The request message can be a RRC message. The request message includes a first indication to allow the UE (100) to send notification to activate the time gap configuration, duration of the time gap configuration, a second indication to allow autonomous activation of the time gap configuration and a third indication indicating the time gap configuration is one of: one shot event or periodic event and if it is periodic event then the periodicity of the time gap.

Based on the request message, the gap event configuration controller (140) is configured to receive a response message including the time gap configuration from one of: the first network entity (200a) and the second network entity (200b). The response message is a RRC message. The response message includes time gap configuration parameters having a predefined timer value indicating duration of the allowed time gap, a first indication whether the UE (100) is allowed to activate the time gap configuration by sending a notification to the first network entity (200a) or the second network entity (200b), a second indication whether the UE (100) is allowed to activate the configured time gap autonomously without a need to send a notification, and and a third indication whether the configured time gap is one shot event or a periodic event and if it is periodic event then the periodicity of the time gap. The UE (100) is configured to store the timer value received in the response message and the received time gap configuration.

After receiving the response message, the gap event configuration controller (140) is configured to activate the time gap configuration when the UE (100) is connected to one of: the first network entity (200a) and the second network entity (200b).

In an embodiment, the time gap configuration is activated by detecting one of a time bound event and a non-time bound event on the second SIM (150b) registered with the second network entity (200b), when the UE (100) is connected to the first network entity (200a) through the first SIM (150a), and activating the time gap configuration through one of: by notifying the first network entity (200a) and autonomously without notifying the first network entity (200a).

The time bound event can be, for example, but not limited to a paging occasion monitoring event, a system information reading event, a cell broadcast reception event and a reception of MBMS. The non-time bound event can be, for example, but not limited to, a PLMN search event, event for periodic TAU procedure and an event for measurements in IDLE state or INACTIVE state.

In another embodiment, the time gap configuration is activated by detecting one of the time bound event and the non-time bound event on the first SIM (150a) registered with the first network entity (200a), when the UE (100) is connected to the second network entity (200b) through the second SIM (150b), and activating the time gap configuration through one of: by notifying the second network entity (200b) and autonomously without notifying the first network entity (200a).

In an embodiment, the time gap configuration is activated, based on the first indication received in the response message, by notifying the first network entity (200a) or the second network entity (200b) indicating a temporary suspension of a data session corresponding to a predefined time duration with the first network entity (200a) or the second network entity (200b), wherein the notification is one of: a MAC CE and a physical control signal, activating the time gap configuration by starting a timer associated with a stored value of the configured time gap duration, and retuning the RF circuitry (160) from one of: the first network entity (200a) if the UE (100) is connected to the first network entity (200a) and the second network entity (200b) if the UE (100) is connected to the second network entity (200b).

In an embodiment, the time gap configuration is activated, based on the second indication received in the response message, by autonomously activating the time gap configuration by starting a timer associated with the stored value of the configured time gap duration, and retuning a RF circuitry (160) from one of: the first network entity (200a) if the UE (100) is connected to the first network entity (200a) and the second network entity (200b) if the UE (100) is connected to the second network entity (200b).

Further, the gap event configuration controller (140) is configured to detect that the timer associated with time gap has expired and indicate the first network entity (200a) or the second network entity (200b) one of: request to resume the temporary suspension of the data session with the first network entity (200a) or the second network entity (200b) or request to release a connection with the first network entity (200a) or the second network entity (200b) to one of: IDLE state or INACTVE state in response to detecting that the timer associated with the time gap has expired.

In an embodiment, the temporary suspension of the data session is requested to be resumed by determining to retune the RF circuitry (160) for the connection with one of: the first network entity (200a) if the UE (100) was previously connected with the first network entity (200a) and with the second network entity (200b) if the UE (100) was previously connected with the second network entity (200b).

In an embodiment, the connection is requested to be released by determining to retune the RF circuitry (160) for the connection with one of: the second network entity (200b) if the UE (100) was previously connected with the first network entity (200a) and with the first network entity (200a) if the UE (100) was previously connected with the second network entity (200b).

The processor (110) is configured to execute instructions stored in the memory (130) and to perform various processes. The communicator (120) is configured for communicating internally between internal hardware components and with external devices via one or more networks.

The memory (130) also stores instructions to be executed by the processor (110). The memory (130) may include non-volatile storage elements. Examples of such nonvolatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a nontransitory storage medium may store data that can, over time, change (e.g., in Random Access Memory (RAM) or cache).

Although the FIG. 1 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to manage the connection of the first SIM (150a) and the second SIM (150b) of the UE (100).

Figure 2:
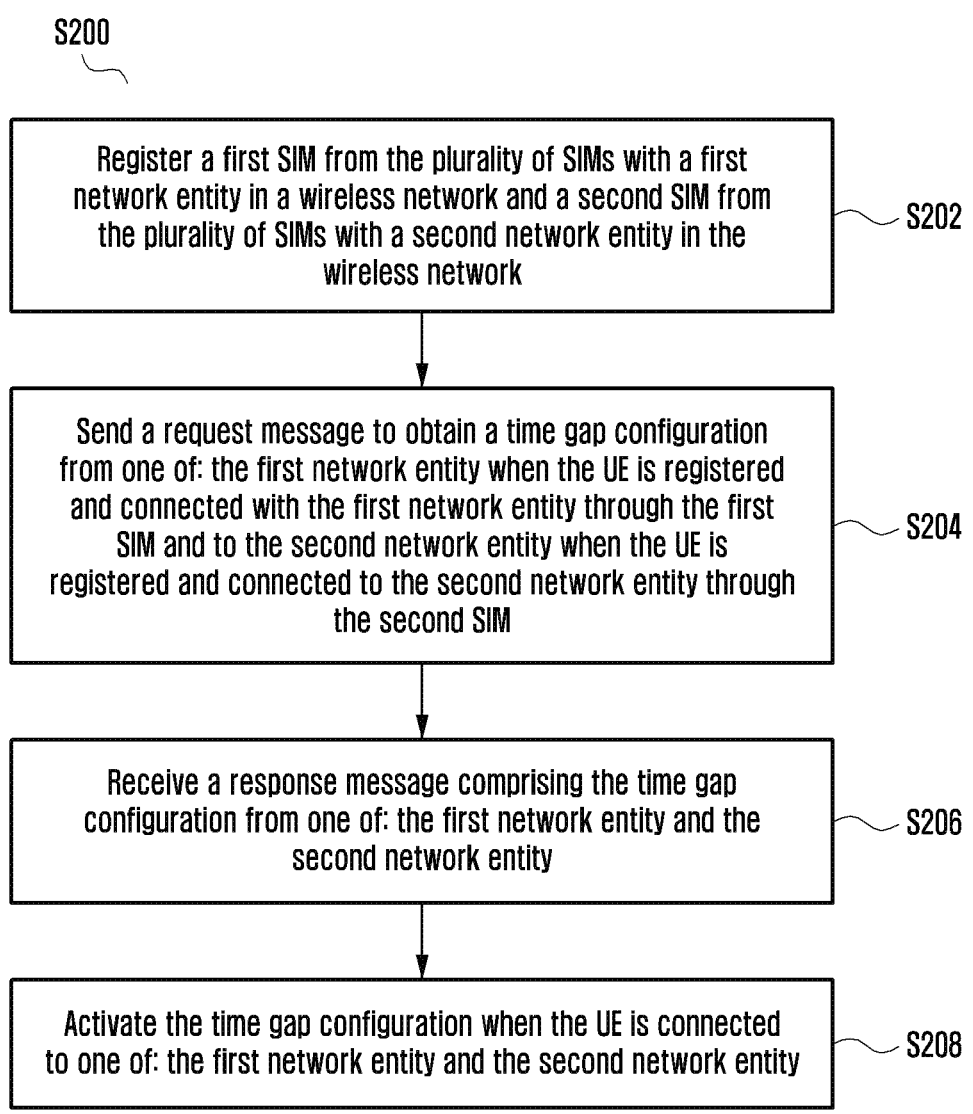
FIG. 2 is a flow chart illustrating a method for managing connection of the first SIM and a second SIM of the UE, according to embodiment as disclosed herein.

FIG. 2 is a flow diagram (S200) illustrating a method for managing the connection of the first SIM (150a) and the second SIM (150b) in the wireless communication system (1000), according to embodiment as disclosed herein. The operations (S202-S08) are performed by the gap event configuration controller (140).

At S202, the method includes registering the first SIM (150a) from the plurality of SIMs (150) with the first network entity (200a) in the wireless network (200) and the second SIM (150b) from the plurality of SIMs (150) with the second network entity (200b) in the wireless network (200). At S204, the method includes sending the request message to obtain the time gap configuration from one of: the first network entity (200a) when the UE (100) is registered and connected with the first network entity (200a) through the first SIM (150a) and to the second network entity (200b) when the UE (100) is registered and connected to the second network entity (200b) through the second SIM (150b). At S206, the method includes receiving the response message comprising the time gap configuration from one of: the first network entity (200a) and the second network entity (200b). At S208, the method includes activating the time gap configuration when the UE (100) is connected to one of: the first network entity (200a) and the second network entity (200b).

The various actions, acts, blocks, steps, or the like in the flow diagram (S200) may be performed in the order presented, in a different order or simultaneously. Further, in some embodiments, some of the actions, acts, blocks, steps, or the like may be omitted, added, modified, skipped, or the like without departing from the scope of the invention.

The UE (100) prioritizes paging reception over system information acquisition:

In an example, the paging occasion for the UE (100) associated with one USIM collides with system information window broadcast by the wireless network (200) associated with the other USIM. The MUSIM UE (100) detects if there is a collision between paging occasion on one USIM and Master Information Block (MIB)/System Information Block (SIB) read occasion on other USIM. In such situation, the UE (100) should prioritize reading the page message over acquisition of the MIB/SIB. Since the MIB/SIB are repeated frequently as compared to a paging cycle i.e. periodicity of MIB/SIB1 is typically smaller than the periodicity of paging occasion. In an example, in the fourth generation wireless communication system like LTE, enhanced node B (eNB) or base station broadcast the system information in the cell. The system information is structured into MIB and a set of SIBs. According to the system information scheduling framework in the LTE, the MIB uses a fixed schedule with a periodicity of 40 ms and repetitions made within 40 ms. The first transmission of the MIB is scheduled in subframe #0 of radio frames for which the System Frame Number (SFN) i.e. SFN mod 4=0, and repetitions are scheduled in subframe #0 of all other radio frames i.e. MIB is repeated every 10 ms. The MIB is transmitted on a physical broadcast channel (PBCH). A System Information Block Type 1 (SIB 1) carries cell identity, tracking area code, cell barring information, value tag (common for all scheduling units), and scheduling information of other SIBs. The SIB1 uses a fixed schedule with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0 i.e. SIB1 is repeated every 20 ms. SIB 1 is transmitted on a Physical downlink shared channel (PDSCH). Other SIBs (SIB 2 to SIB 20) are transmitted in System Information (SI) message within SI window wherein scheduling information of these SIBs are indicated in SIB 1. The minimum value for the paging cycle that can be configured to the UE is 32 radio frames i.e. 320 ms in LTE. Therefore, if paging occasion subframe associated with one USIM collides with the subframe where MIB is broadcasted by the system associated with other USIM, then the UE (100) shall prioritize the reading of paging over acquisition of MIB as depicted in FIG. 1a. Similarly, if the paging occasion subframe associated with one USIM collides with the subframe where the SIB1 is broadcasted by the system associated with other USIM, then the UE (100) shall prioritize the reading of paging over acquisition of SIB 1as depicted in the FIG. 1B. In an embodiment, a rule is defined where if the paging occasion subframe associated with one USIM collides with the subframe where MIB/SIB1 is broadcasted by the system associated with other USIM, then the UE (100) shall prioritize the reading of paging over acquisition of MIB/SIB1. The other SIBs in LTE (SIB2 to SIB20) are broadcasted in SI messages within system information windows. The SI messages are repeated within the SI windows. The minimum value of SI windows that can be configured as 1 ms i.e. one subframe SI window and the minimum value of SI message periodicity is 8 radio frames i.e. 80 ms. Typically SI messages are repeated within the respective SI windows and several SIBs having the same periodicity are mapped into the same SI message. Therefore, if paging occasion subframe associated with one USIM collides with the SI window where SI message is broadcasted by the system associated with other USIM then, the UE (100) shall prioritize the reading of paging over an acquisition of SI message as depicted in the FIG. 1c. One exception to this rule is if system information acquisition on the other SIM is triggered for acquisition of Commercial Mobile Alert System (CMAS)/Earthquake and Tsunami Warning System (ETWS) (i.e. warning messages broadcasted using SI message). In an embodiment, a rule is defined wherein if paging occasion subframe associated with one USIM collides with the SI window where SI message is broadcasted by the system associated with other USIM then, the UE (100) shall prioritize the reading of paging over the acquisition of SI message; except the SI message corresponds to warning messages like CMAS/ETWS.

In the fifth generation wireless communication system information is divided into minimum SI (MSI) and other SI (OSI). The other SI can be structured into a set of SI-blocks (SIBs). The MSI is periodically broadcasted. The MSI comprises of NR MIB and NR SIB1. The OSI can be periodically broadcasted or provided on-demand based on a UE request. The embodiments as disclosed in FIG. 3a, FIG. 3b and FIG. 3c are applicable regardless of the device support dual SIM capability associated with GSM+LTE, LTE+LTE, LTE+VoLTE, VoLTE+VoLTE, VoLTE+NR, LTE+NR, NR+NR so on and so forth.

Figure 3A:
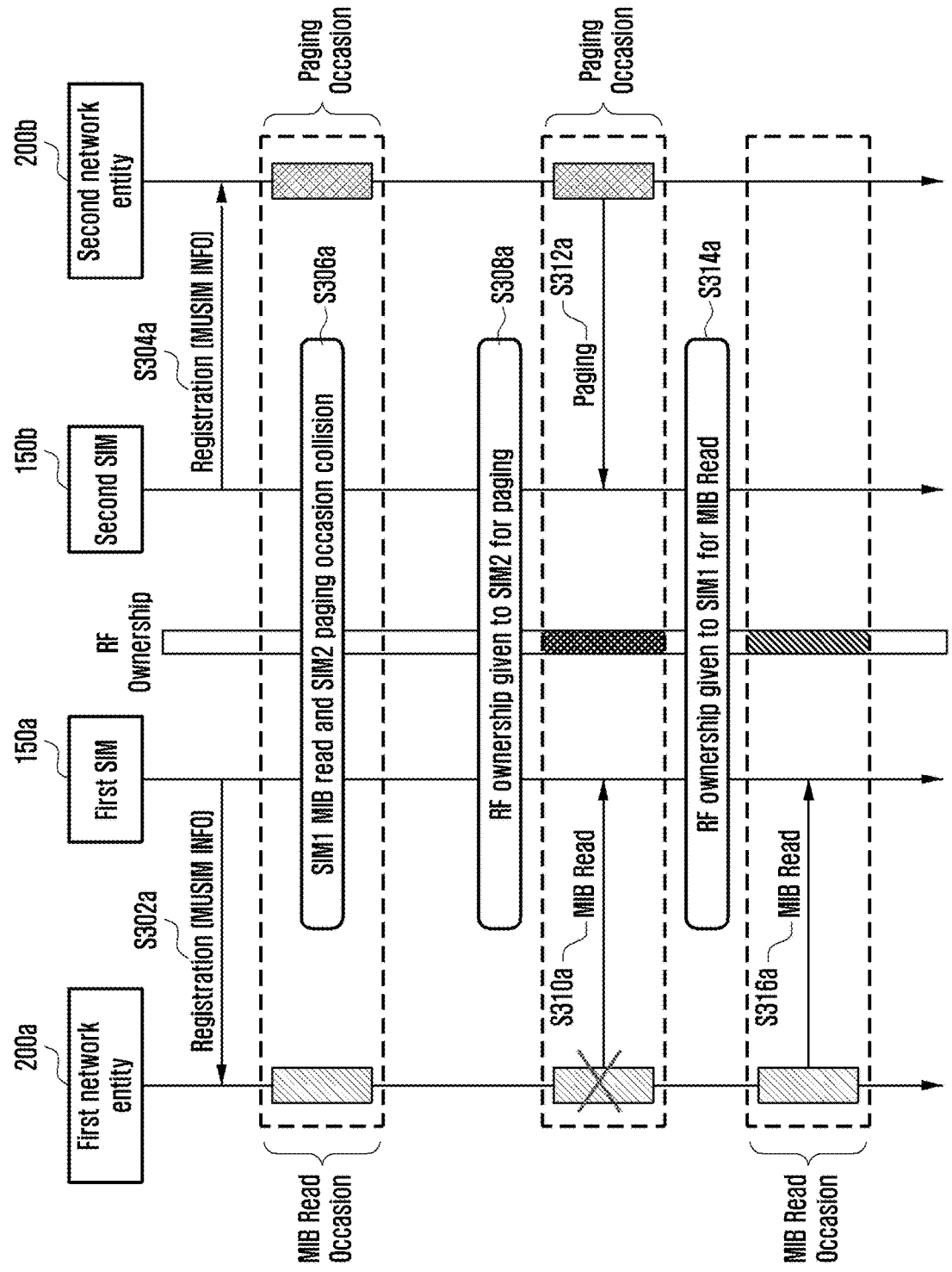
FIG. 3a is an example sequence diagram in which the UE prioritizes paging reception over master information block (MIB) acquisition, according to embodiment as disclosed herein.

The UE (100) prioritizes the paging reception over the MIB acquisition depicted as shown in the FIG. 3a. At S302a, the first SIM (150a) registers with the first network entity (200a). At S304a, the second SIM (150b) registers with the second network entity (200b). At S306a, the UE (100) detects the collision when the first SIM (150a) reads the MIB and the second SIM (150b) reads the paging information. At S308a, the UE (100) decides the RF ownership given to the second SIM (150b) for the paging. At S310a, the first SIM (150a) does not read the MIB. At S312a, the second SIM (150b) reads the paging information. At S314a, the UE (100) decides RF ownership given to the first SIM (150a) for reading the MIB. At S316a, the first SIM (150a) reads the MIB.

Figure 3B:
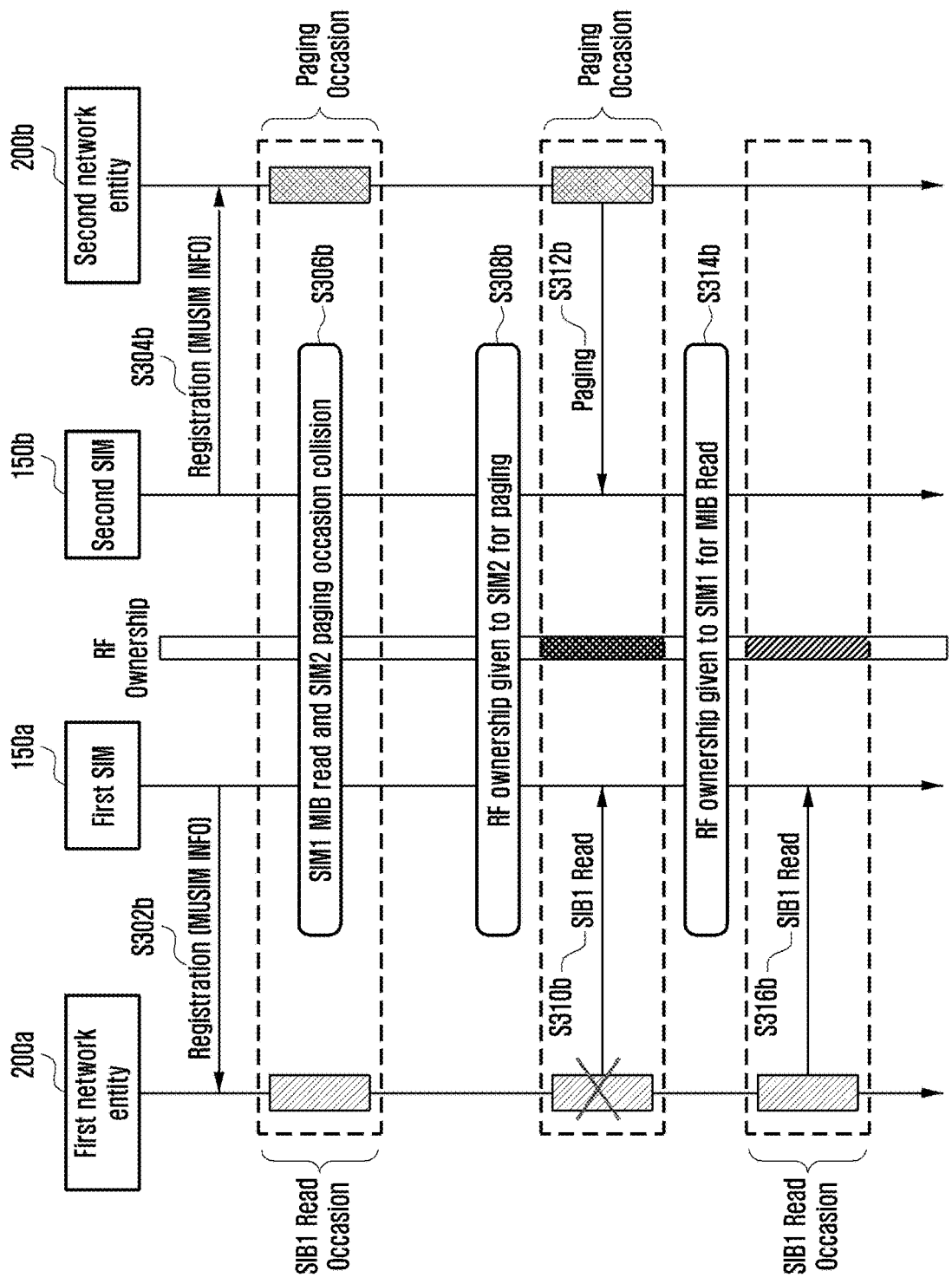
FIG. 3b is an example sequence diagram in which the UE prioritizes the paging reception over System Information Block type 1 (SIB1) acquisition, according to another embodiment as disclosed herein.

The UE (100) prioritizes the paging reception over the SIB1 acquisition depicted as shown in the FIG. 3b. At S302b, the first SIM (150a) registers with the first network entity (200a). At S304b, the second SIM (150b) registers with the second network entity (200b). At S306b, the UE (100) detects the collision when the first SIM (150a) reads the SIB and the second SIM (150b) reads the paging information. At S308b, the UE (100) decides the RF ownership given to the second SIM (150b) for reading the paging information. At S310b, the first SIM (150a) does not read the SIB. At S312b, the second SIM (150b) reads the paging information. At S314b, the UE (100) decides RF ownership given to the first SIM (150a) for the SIB Read. At S316b, the first SIM (150a) reads the SIB.

Figure 3C:
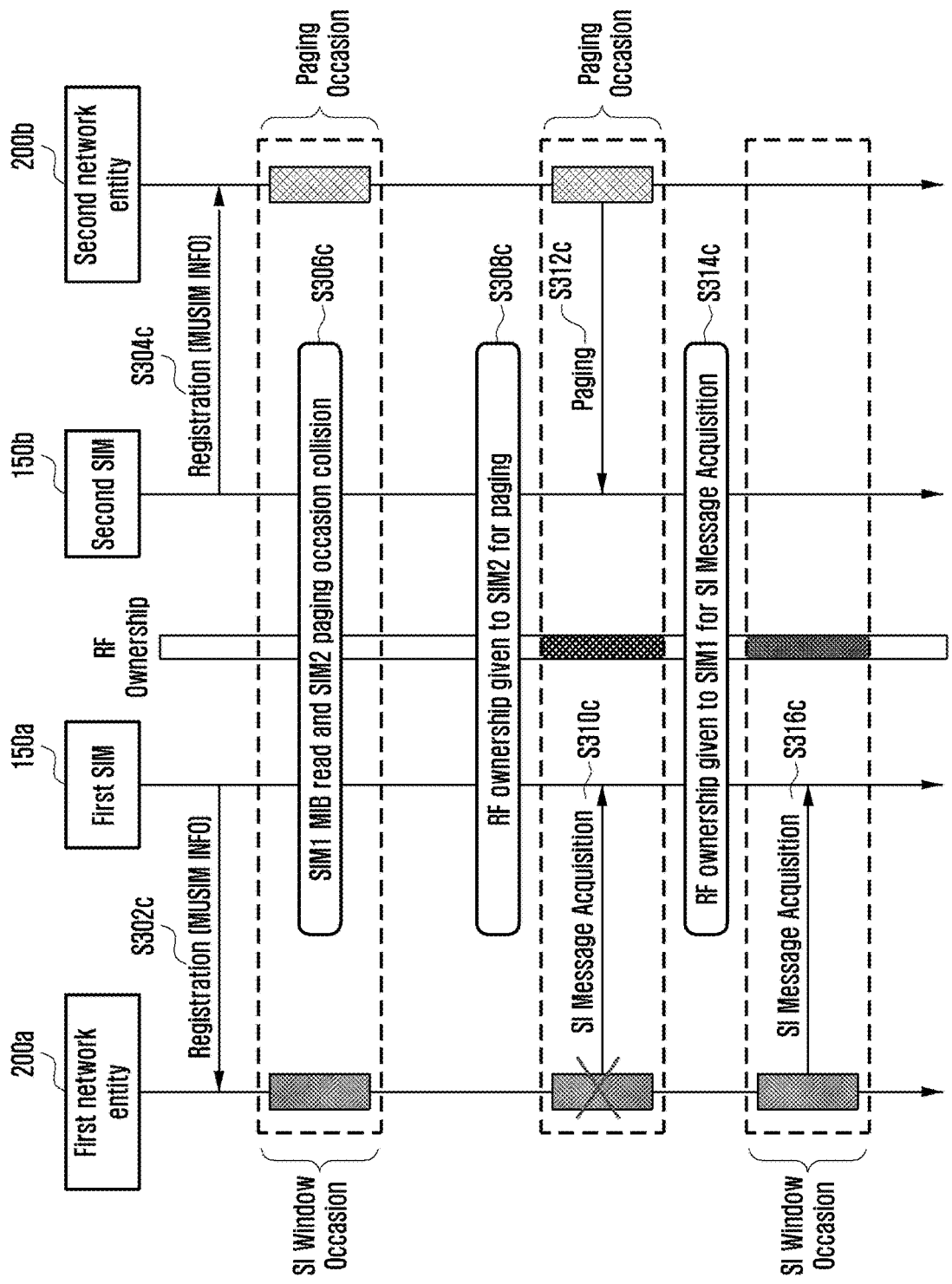
FIG. 3c is an example sequence diagram in which the UE prioritizes the paging reception over System Information (SI) message acquisition except Commercial Mobile Alert System (CMAS)/Earthquake and Tsunami Warning System (ETWS), according to another embodiment as disclosed herein.

The UE (100) prioritizes the paging reception over SI message acquisition except CMAS/ETWS depicted as shown in the FIG. 3c. At S302c, the first SIM (150a) registers with the first network entity (200a). At S304c, the second SIM (150b) registers with the second network entity (200b). At S306c, the UE (100) detects the collision when the first SIM (150a) reads the SI and the second SIM (150b) reads the paging information. At S308c, the UE (100) decides the RF ownership given to the second SIM (150b) for reading the paging information. At S310c, the first SIM (150a) does not read the SI. At S312c, the second SIM (150b) reads the paging information. At S314c, the UE (100) decides the RF ownership given to the first SIM (150a) for the SIB Read. At S316c, the first SIM (150a) reads the SI.

Figure 4A:
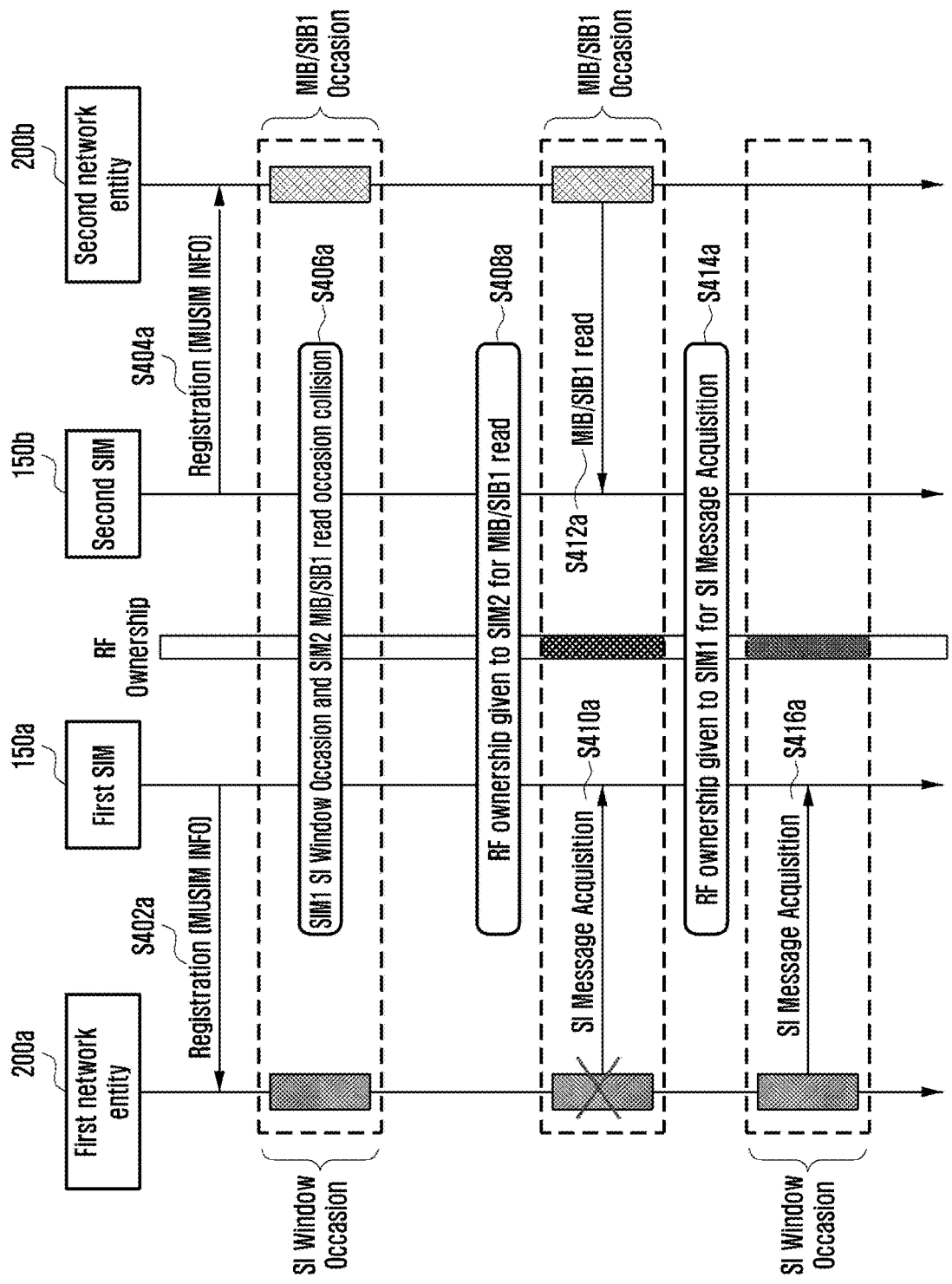
FIG. 4a is an example sequence diagram in which the UE prioritizes the MIB/SIB1 reading over the SI message acquisition except CMAS/ETWS, according to an embodiment as disclosed herein.
Figure 4B:
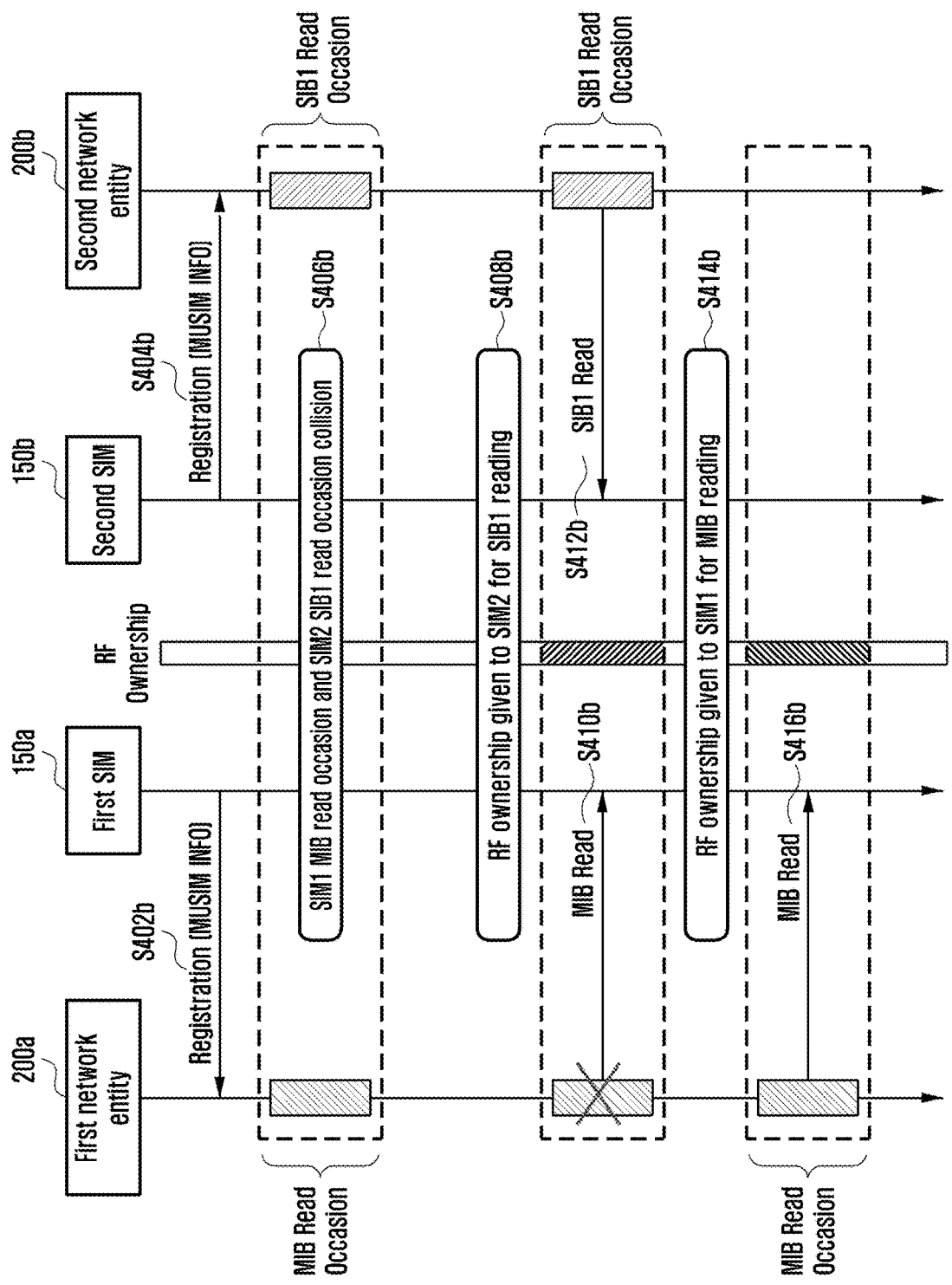
FIG. 4b is an example sequence diagram in which the UE prioritizes SIB1 reading over MIB acquisition, according to another embodiment as disclosed herein.

The UE (100) prioritizes MIB/SIB1 reception over SI message acquisition:

It is possible that MIB/SIB1 broadcast occasion for a UE (100) associated with one USIM collides with system information window broadcast by the network (200) associated with the other USIM. The UE (100) detects if there is a collision between the MIB/SIB1 broadcast occasion on one USIM and SI window broadcast on other USIM. In such situation, the UE (100) should prioritize reading the MIB/SIB1 for SIM #1 over acquisition of SI message for SIM #2. Since the MIB/SIB are essential system information and required for camping on the cell or for accessing the cell it is important not to delay the acquisition of MIB/SIB1. Further, the MIB/SIB1 broadcast in the LTE is on a subframe basis whereas the SI messages are repeated within the SI windows spanning several subframes. It is always possible for the MUSIM UE to continue SI message acquisition for SIM #2 after completion of the MIB/SIB1 acquisition for SIM #1. If the subframe where MIB/SIB1 is broadcasted by the system associated with one USIM collides with the SI window where SI message is broadcasted by the system associated with other USIM, then the UE (100) shall prioritize the reading of MIB/SIB1 over acquisition of SI message; except the SI message corresponds to warning messages like CMAS/ETWS. This is depicted in FIG. 4a. SIB1 acquisition is followed by acquisition of MIB, so if the UE (100) has already acquired MIB for SIM #1 then it should continue with SIB1 acquisition for SIM #1 instead of interrupting the SIB1 acquisition for SIM #1 and start acquisition of MIB for SIM #2. Similarly, if the subframe where MIB is broadcasted by the system associated with one USIM collides with the subframe where SIB1 is broadcasted by the system associated with other USIM then, the UE (100) shall prioritize the reading of SIB1 over acquisition of MIB as depicted in FIG. 4b. In an embodiment, a rule is defined wherein if the subframe where MIB/SIB1 is broadcasted by the system associated with one USIM collides with the SI window where SI message is broadcasted by the system associated with other USIM then, the UE (100) shall prioritize the reading of MIB/SIB1 over acquisition of SI message except the SI message corresponds to warning messages like CMAS/ETWS. In an embodiment, a rule is defined wherein if the subframe where MIB is broadcasted by the system associated with one USIM collides with the subframe where SIB1 is broadcasted by the system associated with other USIM then the UE (100) shall prioritize the reading of SIB1 over acquisition of MIB. The embodiments as disclosed in FIG. 4a and FIG. 4b are applicable regardless of the device support dual SIM capability associated with GSM+LTE, LTE+LTE, LTE+VoLTE, VoLTE+VoLTE, VoLTE+NR, LTE+NR, NR+NR so on and so forth.

The UE (100) prioritizes MIB/SIB1 reading over SI message acquisition except CMAS/ETWS depicted as shown in the FIG. 4a. At S402a, the first SIM (150a) registers with the first network entity (200a). At S404a, the second SIM (150b) registers with the second network entity (200b). At S406a, the UE (100) detects the collision when the first SIM (150a) reads the SI message and the second SIM (150b) reads the SIB1/MIB1. At S408a, the UE (100) decides the RF ownership given to the second SIM (150b) for reading the MIB1/SIB1. At S410a, the first SIM (150a) does not read the SI message. At S412a, the second SIM (150b) reads the MIB/SIB1. At S414a, the UE (100) decides RF ownership given to the first SIM (150a) for the MIB Read. At S416a, the first SIM (150a) reads the SI message.

The UE (100) prioritizes the SIB1 reading over the MIB acquisition depicted as shown in the FIG. 4b. At S402b, the first SIM (150a) registers with the first network entity (200a). At S404b, the second SIM (150b) registers with the second network entity (200b). At S406b, the UE (100) detects the collision when the first SIM (150a) reads the MIB and the second SIM (150b) the reads the SIB1. At S408b, the UE (100) decides the RF ownership given to the second SIM (150b) for reading the SIB1. At S410b, the first SIM (150a) does not read the MIB message. At S412b, the second SIM (150b) reads the SIB1. At S414b, the UE (100) decides RF ownership given to the first SIM (150a) for the MIB Read. At S416b, the first SIM (150a) reads the MIB message.

Figure 5A:
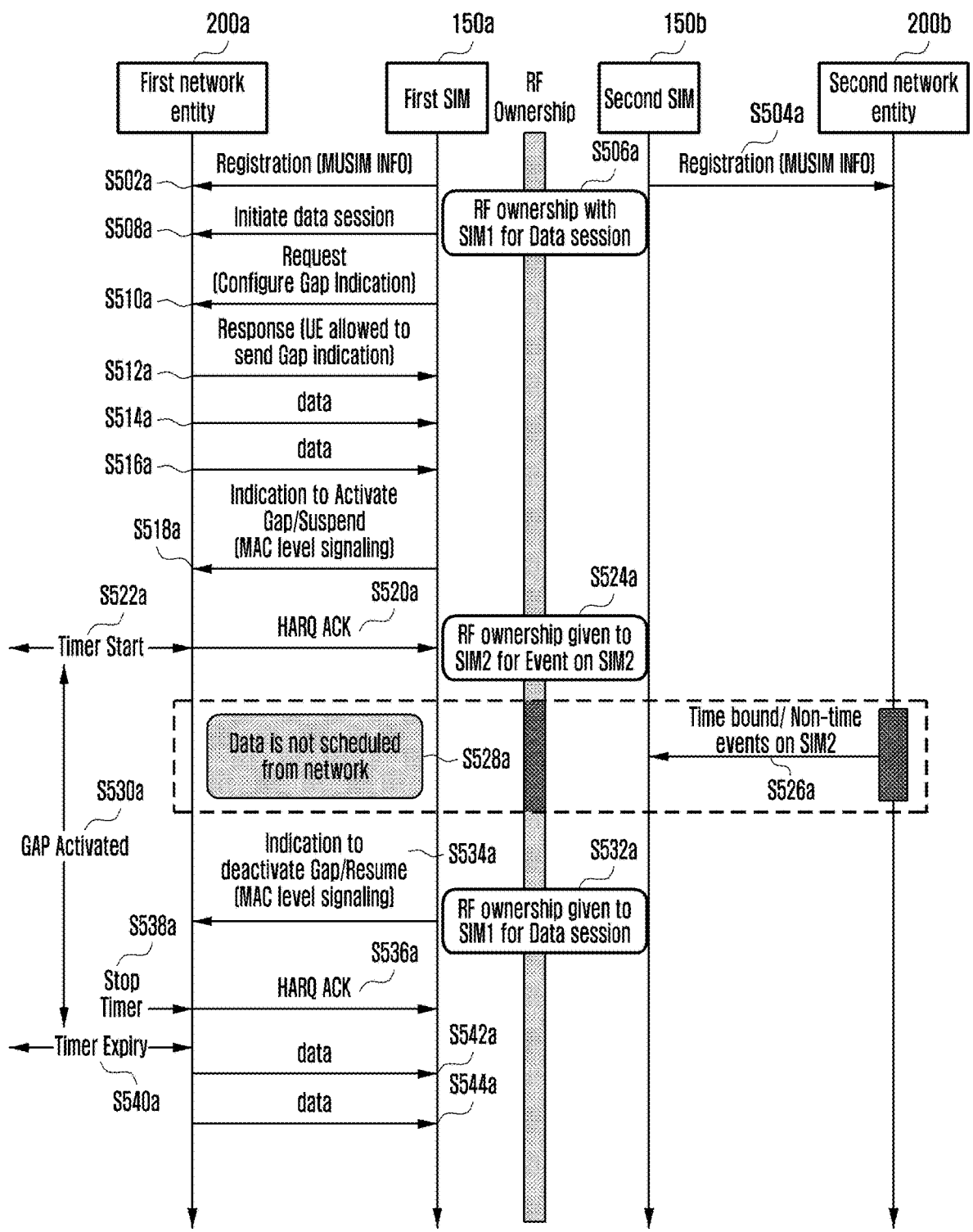
FIG. 5a is an example sequence diagram in which the UE handles a time bound/non-time bound event based on a gap event, according to an embodiment as disclosed herein.
Figure 5B:
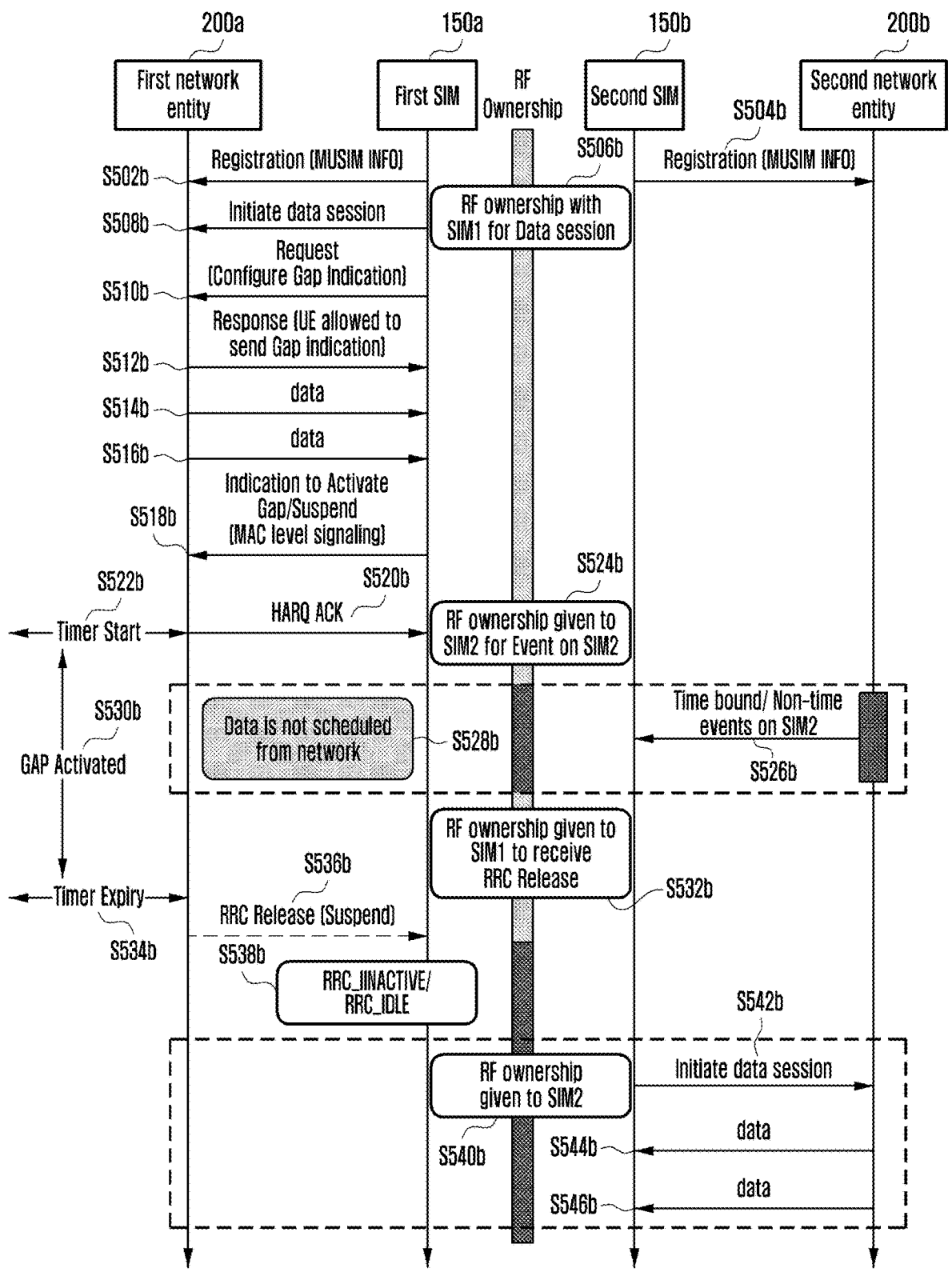
FIG. 5b is an example sequence diagram in which the UE handles time bound/non-time bound event based on the gap event, according to another embodiment as disclosed herein.

The UE (100) handles time bound/non-time bound event based on requested gap:

In an example, when the UE (100) is having PS session on the first USIM and a time bound event (e.g. paging occasion monitoring or reading system information) or a non-time bound event (e.g. PLMN search) on the second USIM is triggered, then the UE (100) has to be temporarily suspend the PS session on the USIM 1 so that the UE (100) can move to other USIM to handle the time bound event or non-time bound event. This is currently handled through implementation where the suspension of PS session on the USIM 1 is done autonomously by the UE (100) without the first network knowledge leading to wastage of resources on the first network side. This can be avoided if the UE (100) requested the first network (200a) to provide gap (i.e. temporary interruption of the PS data session) on the USIM 1 so that the UE (100) can handle the time bound event or the non-time bound on the USIM 2. As shown in FIG. 5a, the UE (100) share expected gap information based on the time bound event or non-time bound event on the USIM 2 to the system (network) associated with USIM 1 i.e. the first network (200a). For enabling such capability on the UE side to request gap should be negotiated after registration on the first network (200a). The UE (200a) shall send a request to activate the gap only if the first network (200a) allows the UE (100) for such capability as shown in FIG. 5a. In an embodiment, the request message is a Radio Resource Control (RRC) message, wherein the request message comprises at least one of: duration of the time gap configuration, a first indication to allow the UE (100) to send notification to activate the time gap configuration, duration of the time gap configuration, periodicity of the time gap configuration, a second indication to allow autonomous activation of the time gap configuration, and a third indication indicating the time gap configuration is one of: one shot event or periodic event and if it is periodic event then the periodicity of the time gap. If the wireless network (200) allows and the UE (100) is configured for sending gap indication, the UE (100) shall send the indication to the wireless network (200) to activate the negotiated gap. In an embodiment, the response message is a RRC message, wherein the response message includes time gap configuration parameters comprising at least one of: a predefined timer value indicating duration of the allowed time gap configuration, a first indication whether the UE (100) is allowed to activate the time gap configuration by sending a notification to the first network entity (200a) or the second network entity (200b), a second indication whether the UE (100) is allowed to activate the configured time gap autonomously without a need to send a notification and a third indication whether the configured time gap is one shot event or a periodic event and if it is periodic event then the periodicity of the time gap. The notification from the UE to the network for activating the time gap can be realized through MAC signaling in the form of a MAC Control Element (MAC CE) or physical layer control signal. The wireless network (200) confirms the activation of the gap by acknowledging the reception of the MAC CE associated with gap indication. If the UE (100) does not receive the acknowledgement which typically would be HARQ ACK, the UE (100) can retransmit the gap indication. Another alternative to realize the indication of gap can be through PHY layer signaling where the UE (100) transmit the indication in an uplink (UL) in the Physical Uplink Control Channel (PUCCH) resource configured to the UE (100). Upon receiving the confirmation from the network (200) to activate the gap the UE (100) starts a timer associated with the gap for the USIM 1 before leaving to USIM 2 for handling the time bound event or non-time bound event. The RF ownership if the UE (100) is single Tx/Rx capable i.e. the UE is DSDS type is transferred to USIM 2. The method depicted in FIG. 5A is applicable regardless of the MUSIM device is DSDS capable or DSDR capable or DSDA capable. The network (200) associated with USIM 1 starts the timer associated with the gap upon acknowledging the reception of gap indication from the UE (100). This negotiated gap can be configured to be in the range of 10 to 100 ms with a granularity of 5 or 10 ms step. While the timer is running on the network side, the USIM 1 system shall stop any data transmission during this period avoiding wastage of resources. The UE (100) remains in a RRC_CONNECTED state and the data session is temporarily suspended. The UE (100) shall come back to USIM 1 and shall send gap de-activate indication through MAC signaling or PHY signaling to USIM 1 system for resuming the data session before the expiry of the timer. While the timer is running i.e. during the configured gap, the UE (100) shall handle any activity for USIM 2. The RF ownership if the UE (100) is single Tx/Rx capable i.e. the UE (100) is DSDS type is transferred back to USIM 1 for sending the de-activate gap indication. The USIM 1 system shall stop the timer upon reception of gap de-activate indication and resume the data transmission after acknowledging the reception of the resume message from the UE (100). In case the timer expires on the network side before the UE (100) attempts to send the gap de-activation indication, the network (200) may release the RRC connection for the UE (100). This can be achieved by either explicitly sending the RRC Release message including suspend configuration sending the UE (100) to RRC_INACTIVE state (as shown in FIG. 5b) or implicitly releasing the RRC connection wherein the UE transition to a RRC_IDLE state (as shown in FIG. 5b). Since the UE (100) also starts an instance of the timer associated with the negotiated gap, the UE (100) shall either send gap de-activate indication to the wireless network (200) before timer expiry or wait to receive RRC Release with suspend configuration from the network on timer expiry or implicitly transition to RRC_IDLE if explicit RRC Release is not received from the NW 1. The method depicted in the FIG. 5b is applicable regardless of the MUSIM device is DSDS capable or DSDR capable or DSDA capable.

In an example, the UE (100) handles the time bound/non-time bound event based on requested gap depicted as shown in the FIG. 5a. At S502a, the first SIM (150a) registers with the first network entity (200a). At S504a, the second SIM (150b) registers with the second network entity (200b). At S506a, the UE (100) decide to provide the RF ownership with the first SIM (150a) for the data session. At S508a, the first SIM (150a) initiates the data session with the first network entity (200a). At S510a, the first SIM (150a) sends the request for the gap event to the first network entity (200a). Based on the request, at 512a, the first network entity (200a) sends the response (i.e., UE allowed to send the gap indication to the first SIM (150a)). At 514a and 516a, the first network entity (200a) sends data to the first SIM (150a). At 518a, the first SIM (150a) sends a message indicating to activate the gap event/a suspend event to the first network entity (200a). At S520a, the first network entity (200a) sends an HARQ acknowledge message to the first SIM (150a). At S522a, the timer is started the first network entity (200a). At S524a, the UE (100) decides to provide the RF ownership to the second SIM (150b) for the event on the second SIM (150b). At S526a, the second network entity (200b) sends the time bound event/the non-time events to the second SIM (150b).

At S528a, the data is not scheduled from the first network entity (200a). At S530a, the gap events are activated. At S532a, the UE (100) decides to provide the RF ownership to the first SIM (150a) for the data session. At 534a, the first SIM (150a) sends the message indicating to deactivate the gap event/a suspend event to the first network entity (200a). At S536a, the first network entity (200a) sends the HARQ acknowledge message to the first SIM (150a). At S538a, the timer is stopped and at S540a, the timer is expired. At 542a and 544a, the first network entity (200a) sends data to the first SIM (150a).

In an example, the UE (100) handles time bound/non-time bound event based on the requested gap depicted as shown in the FIG. 5b. At S502b, the first SIM (150a) registers with the first network entity (200a). At S504b, the second SIM (150b) registers with the second network entity (200b). At S506b, the UE (100) decide to provide the RF ownership with the first SIM (150a) for the data session. At S508b, the first SIM (150a) initiates the data session with the first network entity (200a). At S510b, the first SIM (150a) sends the request for the gap event to the first network entity (200a). Based on the request, at 512b, the first network entity (200a) sends the response (i.e., UE allowed to send the gap indication to the first SIM (150a)). At 514b and 516b, the first network entity (200a) sends data to the first SIM (150a). At 518b, the first SIM (150a) sends the message indicating to activate the gap event/the suspend event to the first network entity (200a). At S520b, the first network entity (200a) sends the HARQ acknowledge message to the first SIM (150a). At S522b, the timer is started the first network entity (200a). At S524b, the UE (100) decides to provide the RF ownership to the second SIM (150b) for the event on the second SIM (150b). At S526b, the second network entity (200b) sends the time bound event/the non-time events to the second SIM (150b).

At S528b, the data is not scheduled from the first network entity (200a). At S530b, the gap events is activated. At S532b, the UE (100) decides to provide the RF ownership to the first SIM (150a) for the data session. At S534b, the timer is expired and at S534b, the timer is expired. At S536b, the first network entity (200a) sends a RRC release message to the first SIM (150a). At S538b, the first SIM (150a) is in a RRC_IINACTIVE/RRC_IDLE state. At S540b, the UE (100) decides to provide the RF ownership to the second SIM (150b). At S542b, the second SIM (150b) initiates the data session with the second network entity (200b). At 544b and 546b, the second network entity (200b) sends data to the second SIM (150b).

Figure 6A:
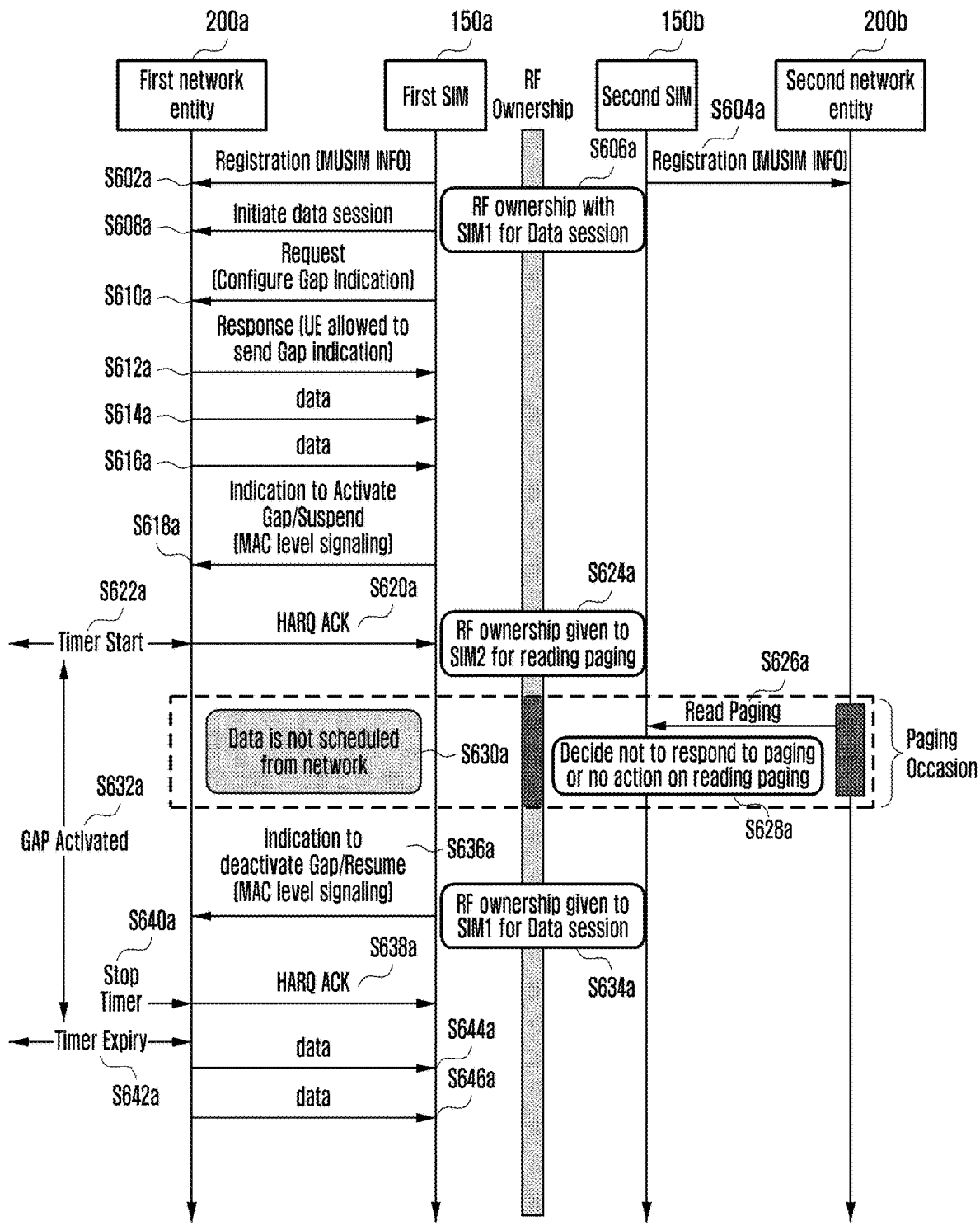
FIGS. 6a, 6b, and 6c are example sequence diagrams in which the UE handles the paging based on the gap event, according to an embodiment as disclosed herein.

UE behavior for handling paging based on the requested gap:

When the UE (100) is having the PS session on the first USIM and a time bound event such as paging occasion monitoring is triggered on the second USIM, then the UE (100) has to be temporarily suspend the PS session on the first USIM by sending the activate gap indication as shown in the FIG. 6a. The time bound event of the paging occasion is taken as an example to illustrate the method and should not be considered as the limiting case. Other time bound event such as system information broadcast or periodic measurements can also be considered in the context of FIG. 6a. The method depicted in FIG. 6a is applicable regardless of the MUSIM device is DSDS capable or DSDR capable or DSDA capable. In an embodiment, the UE (100) sends a request message for negotiating the gap configuration from the network (200) and for allowing the UE (100) to send activate gap indication. In an embodiment, the request message is a Radio Resource Control (RRC) message, wherein the request message comprises at least one of: duration of the time gap configuration, a first indication to allow the UE (100) to send notification to activate the time gap configuration, duration of the time gap configuration, periodicity of the time gap configuration, a second indication to allow autonomous activation of the time gap configuration, and a third indication indicating the time gap configuration is one of: one shot event or periodic event and if it is periodic event then the periodicity of the time gap. In an embodiment, the network (200) sends the response message including the value for configured gap and allowing the UE (100) to send activate gap indication. In an embodiment, the response message is a RRC message, wherein the response message includes time gap configuration parameters comprising at least one of: a predefined timer value indicating duration of the allowed time gap configuration, a first indication whether the UE (100) is allowed to activate the time gap configuration by sending a notification to the first network entity (200a) or the second network entity (200b), a second indication whether the UE (100) is allowed to activate the configured time gap autonomously without a need to send a notification and a third indication whether the configured time gap is one shot event or a periodic event and if it is periodic event then the periodicity of the time gap. In an embodiment, the network (200) sends a response message rejecting the UE (100) request for allowing the UE (100) to send activate gap indication. In an embodiment, the UE (100) upon receiving response message including the value of configured gap and allowing the UE (100) to send activate gap indication, the UE (100) shall send activate gap indication either through MAC signaling or PHY signaling. In an embodiment, the UE (100) upon receiving the acknowledgement from the wireless network in response to the activate gap indication, the UE (100) shall start the timer associated with configured gap and suspend the data session. In an embodiment, the UE (100) shall send the de-activate gap indication to the wireless network (200) before the expiry of the timer associated with configured gap to resume the data session.

In an embodiment, the UE (100) wait for the reception of RRC Release message from the network (200) after the expiry of the timer associated with configured gap. The UE (100) transitions to RRC_INACTIVE state if suspend configuration is included in the RRC Release message else the UE (100) transitions to RRC_IDLE state. In an embodiment, if the UE (100) does not receive the RRC Release message from the network (200) after the expiry of the timer associated with configured gap the UE shall transition to RRC_IDLE state. As shown in FIG. 6a, upon receiving the confirmation from the wireless network (200) to activate the gap the UE (100) starts the timer associated with the gap for USIM 1 before leaving to the USIM 2 for handling the paging occasion. The wireless network (200) associated with USIM 1 starts the timer associated with the gap upon acknowledging the reception of activate gap indication from the UE (100). While the timer is running on the network side, the network associated with USIM 1 shall stop any data transmission during this period avoiding wastage of resources. The UE (100) reads the paging message for the second USIM which may include paging record and assistance information for the UE (100) (e.g. paging cause or paging category or service category) which enables the UE (100) to decide whether to respond to the paging or not. If the UE (100) decides not to respond to the paging because the assistance information indicated the activity on the second USIM is of lower priority than the data session on the first USIM or if the paging message does not have paging record for the UE (100) so that the UE (100) decides to take no action. The time bound event may be system information broadcast window during which the UE (100) acquires the MIB/SIB1 or SI message but decide not to take any further action associated with the second USIM. In such scenario, the UE (100) shall send the de-activate gap indication to the network (200) before the expiry of the timer associated with configured gap to resume the data session on the first USIM as shown in the FIG. 6a. The first USIM system shall stop the timer upon reception of gap de-activate indication and resume the data session after acknowledging the reception of the resume message from the UE.

Figure 6B:
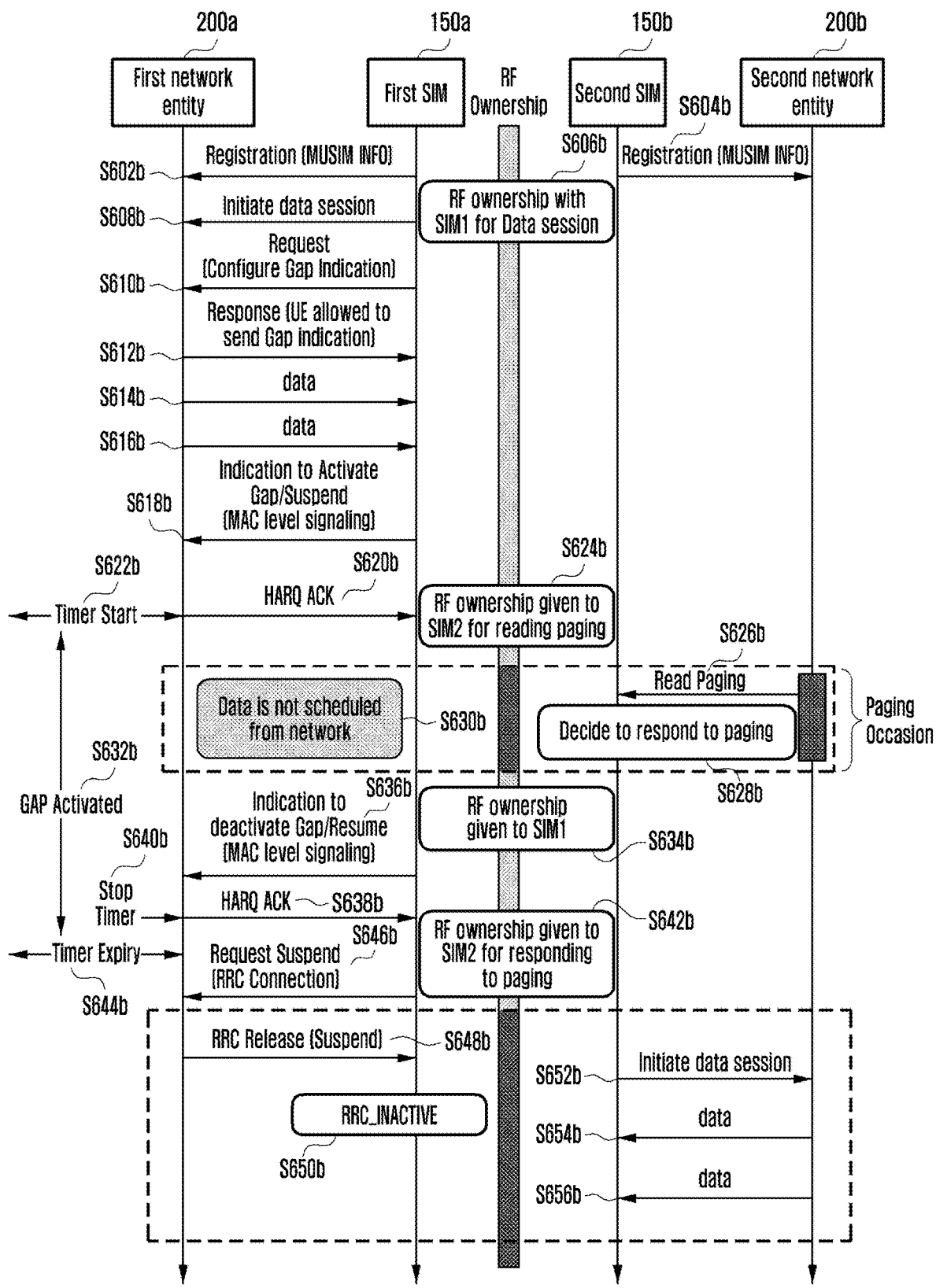
Figure 6C:
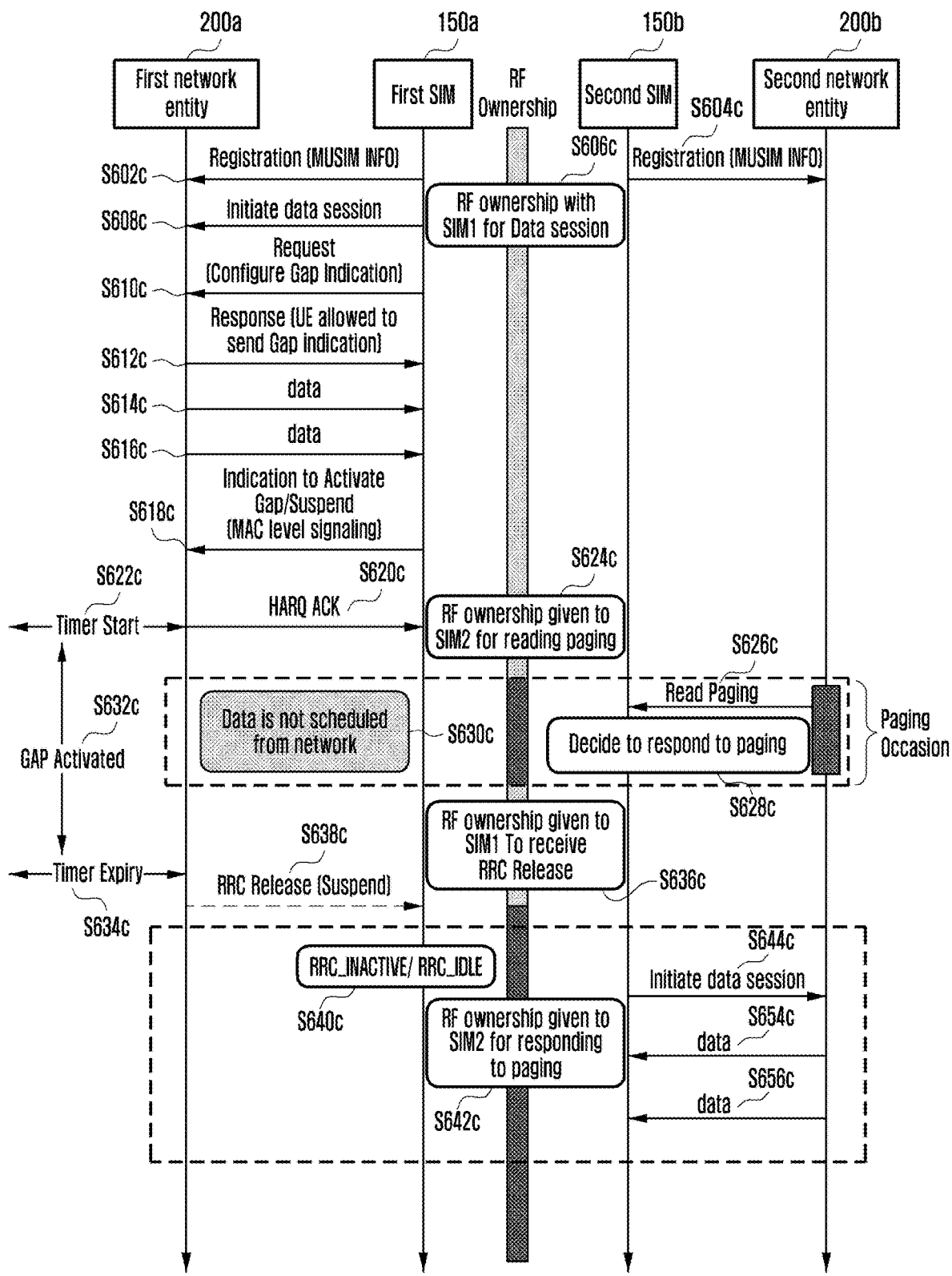

As shown in the FIG. 6b, the UE (100) decides to respond to the paging because the assistance information indicated the activity on the second USIM is of higher priority than the data session on the first USIM or the paging message indicates CMAS/ETWS notification based on which the UE (100) decides to take action to acquire the warning messages broadcasted by the second USIM. In such a scenario, the UE (100) may send the de-activate gap indication to the network (200) before the expiry of the timer associated with configured gap as shown in the FIG. 6b. The method depicted in the FIG. 6b is applicable regardless of the MUSIM UE is DSDS capable or DSDR capable or DSDA capable. Alternatively, the UE (100) may send a RRC message to the first network entity (200a) requesting to suspend the RRC connection. The first USIM shall stop the timer upon reception of gap de-activate indication or the RRC message sent by the UE (100). The RF ownership if the UE (100) is single Tx/Rx capable i.e. the UE (100) is DSDS type is transferred back to the first USIM for sending the de-activate gap indication or the RRC message. The first USIM system determines that the UE (100) is expecting to perform a long term activity on the second USIM, therefore it is logical to release the RRC connection of the UE (100). This can be accomplished in several ways i.e. the first USIM sends RRC Release message which includes the suspend configuration to transition the UE to RRC_INACTIVE state as shown in FIG. 6c. Alternatively, the RRC Release message does not include the suspend configuration which results in the UE transition to RRC_IDLE with respect to the first USIM. Upon transitioning to RRC_INACTIVE or RRC_IDLE, the RF ownership if the UE (100) is single Tx/Rx capable i.e. the UE (100) is DSDS type is transferred to the second USIM for initiating data session on the second USIM or performing long term activity associated with the second USIM.

As shown in the FIG. 6c, the UE (100) decides to respond to the paging because the assistance information indicated the activity on the second USIM is of higher priority than the data session on the first USIM or the paging message indicates CMAS/ETWS notification based on which the UE (100) decides to take action to acquire the warning messages broadcasted by the second USIM. In such scenario, the UE (100) may decide not to send the de-activate gap indication to the network (200) before the expiry of the timer associated with configured gap as shown in the FIG. 6c. The method depicted in FIG. 6c is applicable regardless of the MUSIM device is DSDS capable or DSDR capable or DSDA capable. Alternatively, the UE (100) waits for the expiry of the timer associated with gap negotiated with the first USIM. Since the first USIM does not receive gap de-activate indication or the RRC message from the UE (100). Upon expiry of the timer the first network entity (200*a*) decides to release the RRC connection of the UE (100). The RF ownership if the UE (100) is single Tx/Rx capable i.e. the UE is DSDS type is transferred back to the first USIM for receiving RRC Release message from the first network entity (200*a*). The first USIM determines that the UE (100) is expecting to perform a long term activity on the second USIM, therefore it is logical to release the RRC connection of the UE (100). This can be accomplished in several ways i.e. the first USIM sends RRC Release message which includes the suspend configuration to transition the UE (100) to RRC_INACTIVE state as shown in the FIG. 6*c*. Alternatively, the RRC Release message does not include the suspend configuration which results in the UE transition to RRC_IDLE with respect to the first USIM. In another alternative, there is no RRC Release message from the first network entity (200*a*). The UE (100) autonomously transition to RRC_IDLE and the first network entity (200*a*) implicitly release the RRC connection of the UE (100). Upon transitioning to RRC_INACTIVE or RRC_IDLE, the RF ownership if the UE (100) is single Tx/Rx capable i.e. the UE is DSDS type is transferred to the second USIM for initiating data session on the second USIM or performing long term activity associated with the second USIM.

In an example, the UE (100) handles the paging based on the requested gap depicted as shown in the FIG. 6*a*. At S602*a*, the first SIM (150*a*) registers with the first network entity (200*a*). At S604*a*, the second SIM (150*b*) registers with the second network entity (200*b*). At S606*a*, the UE (100) decides to provide the RF ownership with the first SIM (150*a*) for the data session. At S608*a*, the first SIM (150*a*) initiates the data session with the first network entity (200*a*). At S610*a*, the first SIM (150*a*) sends the request for the gap event to the first network entity (200*a*). Based on the request, at 612*a*, the first network entity (200*a*) sends the response (i.e., UE allowed to send the gap indication to the first SIM (150*a*)). At 614*a* and at 616*a*, the first network entity (200*a*) sends data to the first SIM (150*a*). At 618*a*, the first SIM (150*a*) sends the message indicating to activate the gap event/a suspend event to the first network entity (200*a*). At S620*a*, the first network entity (200*a*) sends the HARQ acknowledge message to the first SIM (150*a*). At S622*a*, the timer is started the first network entity (200*a*). At S624*a*, the UE (100) decides to provide the RF ownership to the second SIM (150*b*) for reading the paging information. At S526*a*, the second network entity (200*b*) sends the paging information to the second SIM (150*b*). At 628*a*, the second SIM (150*b*) decides that there is no response for paging information.

At S630*a*, the data is not scheduled from the first network entity (200*a*). At S632*a*, the gap events are activated. At S634*a*, the UE (100) decides to provide the RF ownership to the first SIM (150*a*) for the data session. At S636*a*, the first SIM (150*a*) sends the message indicating to deactivate the gap event/a suspend event to the first network entity (200*a*). At S638*a*, the first network entity (200*a*) sends the HARQ acknowledge message to the first SIM (150*a*). At S640*a*, the timer is stopped. At S642*a*, the timer is expired. At 644*a* and 646*a*, the first network entity (200*a*) sends data to the first SIM (150*a*).

In an example, the UE (100) handles the paging based on requested gap depicted as shown in the FIG. 6*b*. At S602*b*, the first SIM (150*a*) registers with the first network entity (200*a*). At S604*b*, the second SIM (150*b*) registers with the second network entity (200*b*). At S606*b*, the UE (100) decides to provide the RF ownership with the first SIM (150*a*) for the data session. At S608*b*, the first SIM (150*a*) initiates the data session with the first network entity (200*a*). At S610*b*, the first SIM (150*a*) sends the request for the gap event to the first network entity (200*a*). Based on the request, at 612*b*, the first network entity (200*a*) sends the response (i.e., UE allowed to send the gap indication to the first SIM (150*a*)). At 614*b* and 616*b*, the first network entity (200*a*) sends data to the first SIM (150*a*). At 618*b*, the first SIM (150*a*) sends the message indicating to activate the gap event/a suspend event to the first network entity (200*a*). At S620*b*, the first network entity (200*a*) sends the HARQ acknowledge message to the first SIM (150*a*). At S622*a*, the timer is started at the first network entity (200*a*). At S624*a*, the UE (100) decides to provide the RF ownership to the second SIM (150*b*) for reading the paging information. At S626*a*, the second network entity (200*b*) sends the paging information to the second SIM (150*b*). At 628*b*, the second SIM (150*b*) decides to respond the paging message.

At S630*b*, the data is not scheduled from the first network entity (200*a*). At S632*b*, the gap events are activated. At S634*b*, the UE (100) decides to provide the RF ownership to the first SIM (150*a*) for the data session. At S636*b*, the first SIM (150*a*) sends the message indicating to deactivate the gap event/the suspend event to the first network entity (200*a*). At S638*b*, the first network entity (200*a*) sends the HARQ acknowledge message to the first SIM (150*a*). At S640*b*, the timer is stopped.

At S644*b*, the timer is expired. At S642*b*, the UE (100) decides to provide the RF ownership to the second SIM (150*b*) for the paging information. At S646*b*, the first SIM (150*a*) sends a RRC suspend request message to the first network entity (200*a*). At S648*b*, the first network entity (200*a*) sends a RRC release message to the first SIM (150*a*). At S650*b*, the first SIM (150*a*) is in a RRC_IINACTIVE state. At S652*b*, the second SIM (150*b*) initiates the data session with the second network entity (200*b*). At 654*b* and 656*b*, the second network entity (200*b*) sends data to the second SIM (150*b*).

In an example, the UE (100) handles the paging based on requested gap depicted as shown in the FIG. 6*c*. At S602*c*, the first SIM (150*a*) registers with the first network entity (200*a*). At S604*c*, the second SIM (150*b*) registers with the second network entity (200*b*). At S606*c*, the UE (100) decides to provide the RF ownership with the first SIM (150*a*) for the data session. At S608*c*, the first SIM (150*a*) initiates the data session with the first network entity (200*a*). At S610*c*, the first SIM (150*a*) sends the request for the gap event to the first network entity (200*a*). Based on the request, at 612*c*, the first network entity (200*a*) sends the response (i.e., UE allowed to send the gap indication to the first SIM (150*a*)). At 614*c* and 616*c*, the first network entity (200*a*) sends data to the first SIM (150*a*). At 618*c*, the first SIM (150*a*) sends the message indicating to activate the gap event/the suspend event to the first network entity (200*a*). At S620*c*, the first network entity (200*a*) sends the HARQ acknowledge message to the first SIM (150*a*). At S622*c*, the timer is started at the first network entity (200*a*). At S624*c*, the UE (100) decides to provide the RF ownership to the second SIM (150*b*) for reading the paging information. At S626*c*, the second network entity (200*b*) sends the paging information to the second SIM (150*b*). At 628*c*, the second SIM (150*b*) decides to respond the paging information.

At S630c, the data is not scheduled from the first network entity (200a). At S632c, the gap events are activated. At S634c, the timer is expired. At S636c, the UE (100) decides to provide the RF ownership to the first SIM (150a) to reactive the RRC release message. At S638c, the first network entity (200a) sends a RRC release message to the first SIM (150a). At S640c, the first SIM (150a) is in a RRC_IINACTIVE state. At S642c, the UE (100) decides to provide the RF ownership to the second SIM (150b) to respond the paging message. At S644c, the second SIM (150b) initiates the data session with the second network entity (200b). At 646b and at 648b, the second network entity (200b) sends data to the second SIM (150b).

UE (100) handles time bound/non-time bound event based on autonomous gap

Figure 7A:
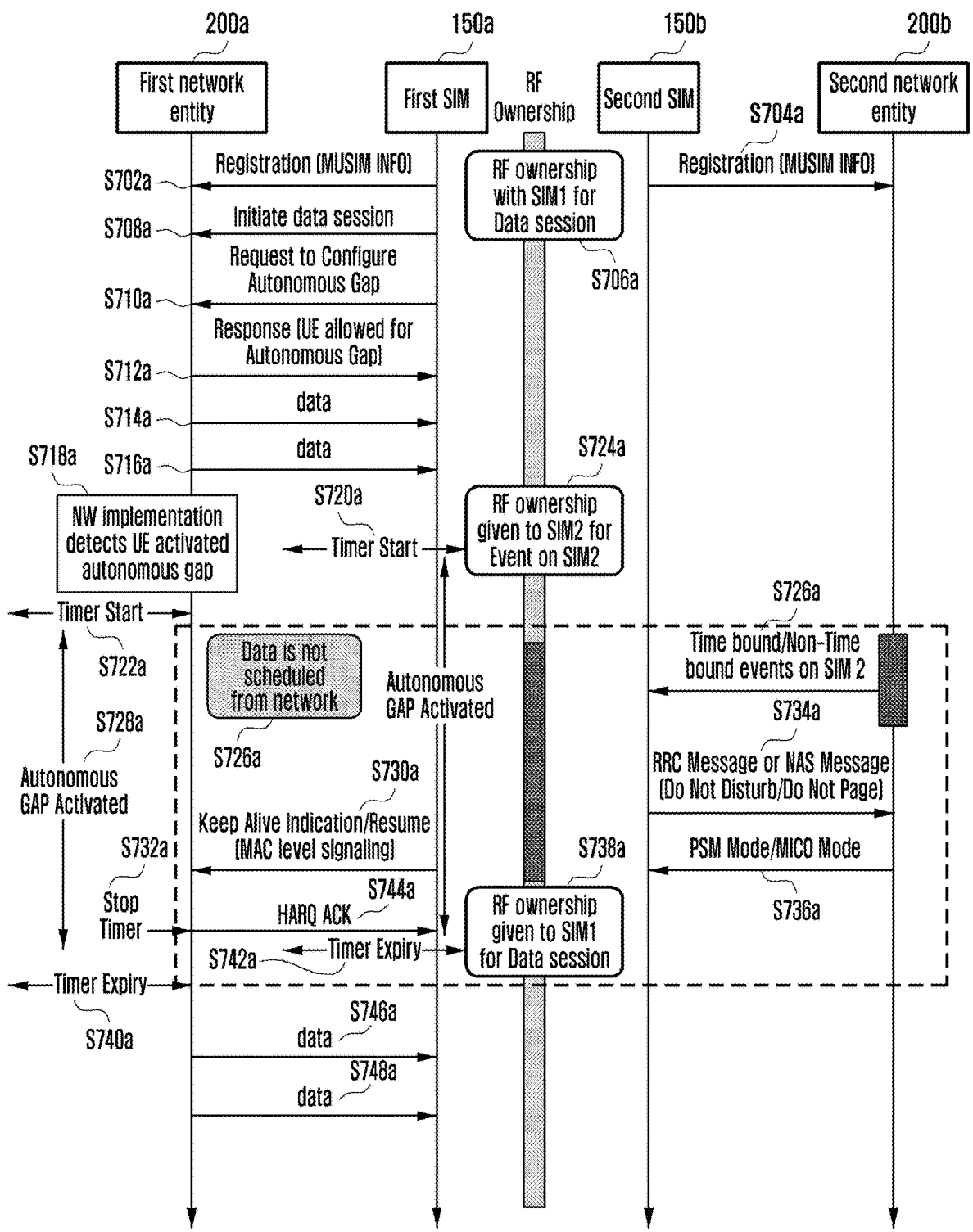
FIGS. 7a, 7b, and 7c are example sequence diagrams in which the UE handles a time bound/non-time bound event based on an autonomous gap event, according to an embodiment as disclosed herein.
Figure 7B:
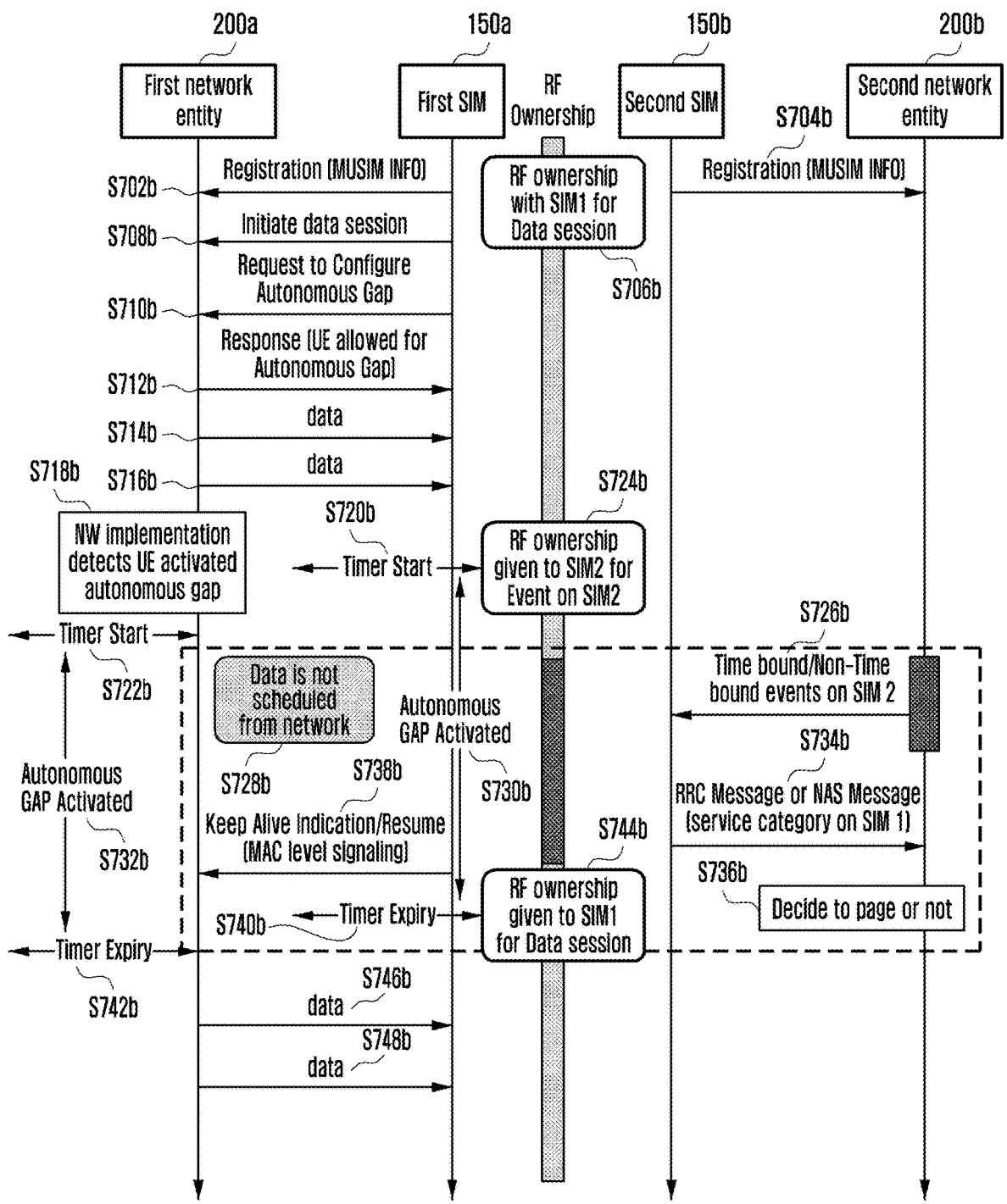

The UE (100) is having PS session on the first USIM and a time bound event (e.g. paging occasion monitoring or reading system information) or the non-time bound event (e.g. PLMN search) on the second USIM is triggered, then the UE (100) has to be temporarily suspend the PS session on the first USIM so that the UE (100) can move to other USIM to handle the time bound event or non-time bound event. This can be handled through suspension of PS session on the first USIM. The UE (100) applies autonomously without explicitly indicating to the first network entity (200a) as shown in the FIG. 7a. As shown in FIG. 7a, the UE (100) negotiate the autonomous gap information with first network entity (200a) based on time bound event or non-time bound event on the second USIM. For enabling such capability on the UE (100) to create autonomous gap the UE (100) should negotiate with the network after registration. The UE (100) shall send request to the network (200) to configure the UE (100) for autonomous gap capability and only if the network (200) allows the UE (100) for such capability as shown in FIG. 7a the UE (100) is allowed to create autonomous gap based on the configured value. In an embodiment, the time gap configuration is activated, based on the indication received in the response message from the network, the UE (100) autonomously activates the time gap configuration by starting a timer associated with the stored value of the configured time gap duration; and retunes a RF circuitry (160) from the first network (200). If the network (200) configures and the UE (100) creates the autonomous gap to handle time bound or non-time bound events on the other USIM, the UE (100) shall send the keep-alive indication to the network (200) before the expiry of the negotiated autonomous gap. On the network side it is left to network implementation to determine when the UE (100) has created autonomous gap. This can be based for e.g. if the network (200) does not detect in the UL PHY control signals like CSI feedback, HARQ ACK/NAK feedback, SRS or SR on the PUCCH. Upon determining the UE (100) has activated the autonomous gap the network start a timer associated with the gap for the first USIM. The UE (100) also starts a timer instance before leaving to the second USIM for handling the time bound event or non-time bound event. The RF ownership if the UE (100) is single Tx/Rx capable i.e. the UE (100) is DSDS type is transferred to the second USIM. The method depicted in the FIG. 7a is applicable regardless of the MUSIM device is DSDS capable or DSDR capable or DSDA capable. This negotiated autonomous gap can be configured to be in the range of 10 to 100 ms with a granularity of 5 or 10 ms step. There can be certain restrictions imposed by the network on the UE (100) while configuring such autonomous gap. The UE (100) is allowed to create such autonomous gap within a specified time period for e.g. if the UE (100) is configured with 100 ms autonomous gap then this applicable for a period of 10 s. If the UE (100) creates autonomous gap at time instance T1 then the UE (100) is not allowed to create another autonomous gap within the time period T1+10 s. In other words after T1+10 s the UE (100) is allowed to create another autonomous gap. While the timer for the autonomous gap is running on the network side, the first USIM shall stop any data transmission during this period avoiding wastage of resources. The UE (100) remains in a RRC_CONNECTED state and the data session is temporarily suspended. During the autonomous gap, the UE (100) handles the time bound or non-time bound event on the second USIM. The UE (100) can send the RRC message or the NAS message to the second network entity (200b) indicating the network not to disturb i.e. not to send paging to the UE (100) as shown in FIG. 7a. In response to the "do not disturb" request from the UE (100), the second USIM may send the UE (100) to a Power Saving Mode (PSM) or a Mobile Initiated Controlled Operation (MICO) mode. If the PSM/MICO mode is enabled for the UE (100) by the second USIM, the UE (100) is not expected to read or monitor paging from the second network entity (200b). Alternatively, the UE (100) can include the service category of the service running on the first USIM in the RRC message or NAS message sent to the second network entity (200b) as shown in FIG. 7b. The service category corresponding with services on the first USIM indicates the priority associated with the first USIM service. Based on this information the second network entity (200b) determines whether to page the UE (100) or not. For e.g. if the priority of the service of the first USIM is lower than the priority of service triggered on the second USIM, then the second network entity (200b) can page the UE (100) else the second network entity (200b) decides not the page the UE (100) since the UE (100) may ignore the page for lower priority service triggered on the second USIM.

Figure 7C:
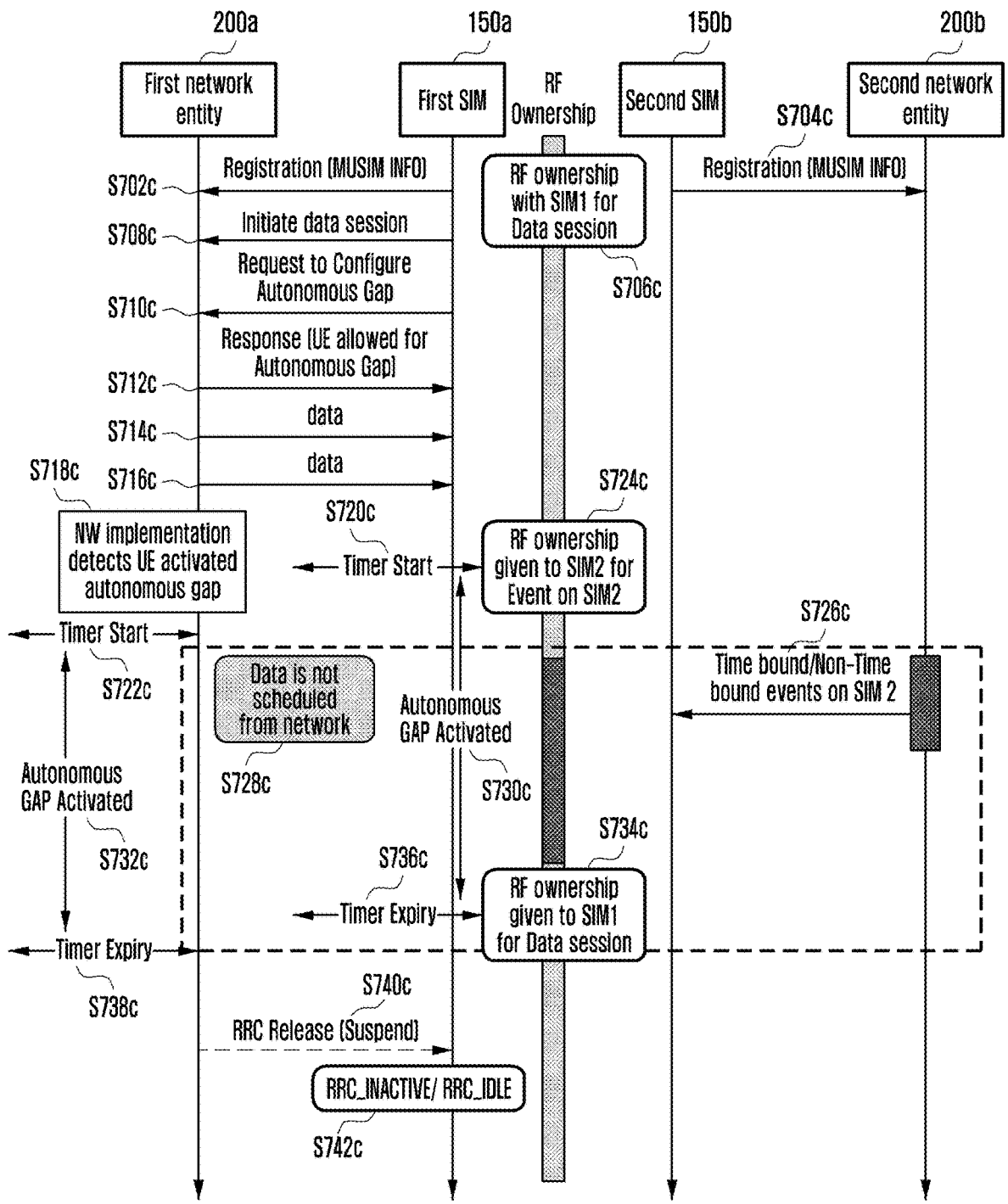

The UE (100) shall come back to the first USIM and shall send keep-alive indication through the MAC signaling or the PHY signaling to the first USIM for resuming the data session before the expiry of the timer as shown in the FIG. 7a. While the timer is running i.e. during the configured autonomous gap, the UE (100) shall handle any activity for the second USIM. The RF ownership if the UE (100) is single Tx/Rx capable i.e. the UE (100) is DSDS type is transferred back to the first USIM for sending the keep-alive indication. The first USIM shall stop the timer upon reception of keep-alive indication from the UE (100) and resume the data transmission after acknowledging the reception of resume message from the UE (100). In case, the timer expires on the network side before the UE (100) attempts to send the keep-alive indication, the first network entity (200a) may release the RRC connection for the UE (100). This can be achieved by either explicitly sending the RRC release message including suspend configuration sending the UE (100) to a RRC_INACTIVE state (as shown in FIG. 7c) or implicitly releasing the RRC connection wherein the UE transition to a RRC_IDLE state (as shown in FIG. 7C). Since the UE (100) also starts an instance of the timer associated with the negotiated autonomous gap, the UE (100) shall either send keep-alive indication to network before timer expiry or wait to receive RRC Release with suspend configuration from the network on the timer expiry or implicitly transition to the RRC_IDLE if explicit RRC Release is not received from the first network entity (200a). The method depicted in FIG. 7c is applicable regardless of the MUSIM device is DSDS capable or DSDR capable or DSDA capable.

In an example, the UE (100) handles the time bound/non-time bound event based on the autonomous gap depicted as shown in the FIG. 7*a*. At S702*a*, the first SIM (150*a*) registers with the first network entity (200*a*). At S704*a*, the second SIM (150*b*) registers with the second network entity (200*b*). At S706*a*, the UE (100) decides to provide the RF ownership with the first SIM (150*a*) for the data session. At S708*a*, the first SIM (150*a*) initiates the data session with the first network entity (200*a*). At S710*a*, the first SIM (150*a*) sends the request for configure autonomous gap event to the first network entity (200*a*). Based on the request, at 712*a*, the first network entity (200*a*) sends the response (i.e., UE allowed to activate the autonomous gap event on the first SIM (150*a*)). At 714*a* and at 716*a*, the first network entity (200*a*) sends data to the first SIM (150*a*). At S718*a*, the first network entity (200*a*) detects that the UE (100) is activated the autonomous gap event. At S720*a*, the timer is started the first SIM (150*a*). At S722*a*, the timer is started the first network entity (200*a*).

At S724*a*, the UE (100) decides to provide the RF ownership to the second SIM (150*b*) for the events. At S726*a*, the second network entity (200*b*) sends the time bound events/non-time bound events on the second SIM (150*b*). At S726*a*, the data is not scheduled from the first network entity (200*a*). At S728*a*, the gap events is activated. At 730*a*, the first SIM (150*a*) sends the message indicating to alive the gap event to the first network entity (200*a*). At S732*a*, the timer is stopped at the first network entity (200*a*). At 734*a*, the second SIM (150*b*) sends a RRC message or NAS message to the second network entity (200*b*), where the RRC message or NAS message includes "do not page information" or "do not disturb information". At S736*a*, the second network entity (200*b*) sends a PSM Mode/MICO Mode to the second SIM (150*b*). At S738*a*, the UE (100) decides to provide the RF ownership to the first SIM (150*a*) for the data session.

At S740*a*, the timer is stopped at the first network entity (200*a*) and at S742*a*, the timer is stopped at the first SIM (150*a*). At S744*a*, the first network entity (200*a*) sends the HARQ acknowledge message to the first SIM (150*a*). At 746*a* and at 748*a*, the second network entity (200*b*) sends data to the second SIM (150*b*).

In an example, the UE (100) handles time bound/non-time bound event based on the autonomous gap depicted as shown in the FIG. 7*b*. At S702*b*, the first SIM (150*a*) registers with the first network entity (200*a*). At S704*b*, the second SIM (150*b*) registers with the second network entity (200*b*). At S706*b*, the UE (100) decides to provide the RF ownership with the first SIM (150*a*) for the data session. At S708*b*, the first SIM (150*a*) initiates the data session with the first network entity (200*a*).

At S710*b*, the first SIM (150*a*) sends the request for configure autonomous gap event to the first network entity (200*a*). Based on the request, at 712*a*, the first network entity (200*a*) sends the response (i.e., UE allowed to activate the autonomous gap event on the first SIM (150*a*)). At 714*a* and 716*a*, the first network entity (200*a*) sends the data to the first SIM (150*a*). At S718*a*, the first network entity (200*a*) detects that the UE (100) is activated the autonomous gap event. At S720*b*, the timer is started at the first SIM (150*a*). At S722*b*, the timer is started at the first network entity (200*a*).

At S724*b*, the UE (100) decides to provide the RF ownership to the second SIM (150*b*) for the events. At S726*b*, the second network entity (200*b*) send the time bound events/non-time bound events on the second SIM (150*b*). At S728*b*, the data is not scheduled from the first network entity (200*a*). At S730*b*, the gap events is activated at the first SIM (150*a*). At S732*b*, the gap events is activated at the first network entity (200*a*). At 734*b*, the second SIM (150*b*) sends a RRC message or NAS message to the second network entity (200*b*), where the RRC message or NAS message includes the service category on the first SIM (150*a*). Based on the RRC message or the NAS message, at S736*b*, the second network entity (200*b*) decides for the paging.

At 738*b*, the first SIM (150*a*) sends the message indicating to alive the gap event to the first network entity (200*a*). At S740*b*, the timer is stopped at the first SIM (150*a*). At S742*b*, the timer is stopped at the first network entity (200*a*). At S744*b*, the UE (100) decides to provide the RF ownership to the first SIM (150*a*) for the data session. At 746*b* and 748*b*, the first network entity (200*a*) sends data to the first SIM (150*a*).

In an example, the UE (100) handles the time bound/non-time bound event based on the autonomous gap depicted as shown in the FIG. 7*c*. At S702*c*, the first SIM (150*a*) registers with the first network entity (200*a*). At S704*c*, the second SIM (150*b*) registers with the second network entity (200*b*). At S706*c*, the UE (100) decides to provide the RF ownership with the first SIM (150*a*) for the data session. At S708*c*, the first SIM (150*a*) initiates the data session with the first network entity (200*a*). At S710*c*, the first SIM (150*a*) sends the request for configure autonomous gap event to the first network entity (200*a*). Based on the request, at 712*c*, the first network entity (200*a*) sends the response (i.e., UE allowed to activate the autonomous gap event on the first SIM (150*a*)). At 714*c* and 716*c*, the first network entity (200*a*) sends the data to the first SIM (150*a*). At S718*c*, the first network entity (200*a*) detects that the UE (100) is activated the autonomous gap event. At S720*c*, the timer is started at the first SIM (150*a*). At S722*c*, the timer is started at the first network entity (200*a*).

At S724*c*, the UE (100) decides to provide the RF ownership to the second SIM (150*b*) for the events. At S726*c*, the second network entity (200*b*) send the time bound events/non-time bound events on the second SIM (150*b*). At S728*c*, the data is not scheduled from the first network entity (200*a*). At S730*c*, the gap events is activated at the first SIM (150*a*). At S732*c*, the gap events is activated at the first network entity (200*a*). At S734*c*, the UE (100) decides to provide the RF ownership to the first SIM (150*a*) for the data session. At S736*c*, the timer is stopped at the first SIM (150*a*). At S738*c*, the timer is stopped at the first network entity (200*a*). At 740*c*, the first network entity (200*a*) sends a RRC release message to the first SIM (150*a*). Based on the RRC release message, the UE (100) is in an RRC Inactive state or RRC ideal state.

According to the above, embodiments herein disclose a method for operating a UE comprising a plurality of SIMs in a wireless communication system. The method includes registering, by the UE, a first SIM from the plurality of SIMs with a first network entity in a wireless network and a second SIM from the plurality of SIMs with a second network entity in the wireless network. Further, the method includes sending, by the UE, a request message to obtain a time gap configuration from one of: the first network entity when the UE is registered and connected with the first network entity through the first SIM and to the second network entity when the UE is registered and connected to the second network entity through the second SIM. Further, the method includes receiving, by the UE, a response message comprising the time gap configuration from one of: the first network entity and the second network entity. Further, the method includes activating, by the UE, the time gap configuration when the UE is connected to one of: the first network entity and the second network entity.

In an embodiment, the time gap configuration is activated, based on the first indication received in the response message, by notifying the network entity indicating a temporary suspension of a data session corresponding to a predefined time duration with the network entity, wherein the notification is one of: a MAC CE and a physical control signal, activating the time gap configuration by starting a timer associated with a stored value of the configured time gap duration, and retuning a radio frequency (RF) circuitry from one of: the first network entity if the UE is connected to the first network entity and the second network entity if the UE is connected to the second network entity.

In an embodiment, the time gap configuration is activated, based on the first indication received in the response message, by notifying the network entity indicating a temporary suspension of a data session corresponding to a predefined time duration with the network entity, wherein the notification is one of: a MAC CE and a physical control signal, activating the time gap configuration by starting a timer associated with a stored value of the configured time gap duration, and retuning a radio frequency (RF) circuitry from one of: the first network entity if the UE is connected to the first network entity and the second network entity if the UE is connected to the second network entity.

In an embodiment, the time gap configuration is activated, based on the second indication received in the response message, by autonomously activating the time gap configuration by starting a timer associated with the stored value of the configured time gap duration, and retuning the RF circuitry from one of: the first network entity if the UE is connected to the first network entity and the second network entity if the UE is connected to the second network entity.

In an embodiment, the method further comprises: detecting that the timer associated with time gap has expired; and indicating the first network entity (200a) or the second network entity (200b) one of: request to resume the temporary suspension of the data session with the the first network entity (200a) or the second network entity (200b) and request to release a connection with the first network entity (200a) or the second network entity (200b) to one of: IDLE state or INACTVE state in response to detecting that the timer associated with the time gap has expired.

In an embodiment, the temporary suspension of the data session is requested to be resumed by determining to retune the RF circuitry (160) for the connection with one of: the first network entity (200a) if the UE (100) was previously connected with the first network entity (200a) and with the second network entity (200b) if the UE (100) was previously connected with the second network entity (200b).

In an embodiment, the connection is requested to be released by determining to retune the RF circuitry (160) for the connection with one of: the second network entity (200b) if the UE (100) was previously connected with the first network entity (200a) and with the first network entity (200a) if the UE (100) was previously connected with the second network entity (200b).

According to the above, embodiments herein disclose a UE includes a processor coupled with a memory. The processor is configured to register a first SIM from a plurality of SIMs with a first network entity in a wireless network and a second SIM from the plurality of SIMs with a second network entity in the wireless network. Further, the processor is configured to send a request message to obtain a time gap configuration from one of: the first network entity when the UE is registered and connected with the first network entity through the first SIM and to the second network entity when the UE is registered and connected to the second network entity through the second SIM. Further, the processor is configured to receive a response message including the time gap configuration from one of: the first network entity and the second network entity. Further, the processor is configured to activate the time gap configuration when the UE is connected to one of: the first network entity and the second network entity.

In an embodiment, the time gap configuration is activated, based on a second indication received in the response message, by: notifying the first network entity (200a) or the second network entity (200b) indicating a temporary suspension of a data session corresponding to a predefined time duration with the first network entity (200a) or the second network entity (200b), wherein the notification is one of: a Medium Access Control Control-Element (MAC CE) and a physical control signal; activating the time gap configuration by starting a timer associated with a stored value of the configured time gap duration; and retuning a radio frequency (RF) circuitry (160) from one of: the first network entity (200a) if the UE (100) is connected to the first network entity (200a) and the second network entity (200b) if the UE (100) is connected to the second network entity (200b).

In an embodiment, the time gap configuration is activated, based on a third indication received in the response message, by: autonomously activating the time gap configuration by starting a timer associated with the stored value of the configured time gap duration; and retuning a RF circuitry (160) from one of: the first network entity (200a) if the UE (100) is connected to the first network entity (200a) and the second network entity (200b) if the UE (100) is connected to the second network entity (200b).

In an embodiment, the processor (110) is configured to: detect that the timer associated with time gap has expired; and indicate the first network entity (200a) or the second network entity (200b) one of: request to resume the temporary suspension of the data session with the the first network entity (200a) or the second network entity (200b) and request to release a connection with the first network entity (200a) or the second network entity (200b) to one of: an IDLE state or an INACTVE state in response to detecting that the timer associated with time gap has expired.

In an embodiment, the temporary suspension of the data session is requested to be resumed by determining to retune the RF circuitry (160) for the connection with one of: the first network entity (200a) if the UE (100) was previously connected with the first network entity (200a) and with the second network entity (200b) if the UE (100) was previously connected with the second network entity (200b).

In an embodiment, the connection is requested to be released by determining to retune the RF circuitry (160) for the connection with one of: the second network entity (200b) if the UE (100) was previously connected with the first network entity (200a) and with the first network entity (200a) if the UE (100) was previously connected with the second network entity (200b).

The method can be used to efficiently handle the paging procedure, system information acquisition, managing data sessions etc. by the dual SIM/MUSIM devices regardless of the Tx/Rx capability. This is applicable when the device is registered on EPC through both SIMs, registered on 5GC through both SIMs or registered on EPC through one SIM and registered on 5GC through the other SIM. The embodiments in the disclosure are illustrated using dual SIM as an example but can be extended further to plurality of SIMs.

The embodiments in the disclosure are illustrated using dual SIM as an example but can be extended further to plurality of SIMs. This is applicable when the device is registered on EPC through both SIMs, registered on 5GC through both SIMs or registered on EPC through one SIM and registered on 5GC through the other SIM.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

INDUSTRIAL APPLICABILITY

Various embodiments of the present application can be used for wireless communication.

The invention claimed is:

1. A method performed by a user equipment (UE) comprising a plurality of subscriber identity modules (SIMs) in a wireless communication system, the method comprising:
receiving, from a second network entity associated with a second SIM, a paging message when the UE is connected with a first network entity through a first SIM;
transmitting, to the second network entity, a message in response to the paging message during a time gap configuration;
determining which network entity to use either the first network entity or the second network entity based on the paging message; and
receiving, from the first network entity, a service associated with the first network entity in case that the UE determines to continue using the first network entity; or
receiving, from the second network entity, a service associated with the second network entity in case that the UE determines to use the second network entity.

2. The method of claim 1, further comprising:
transmitting, to the first network entity, a request message to obtain the time gap configuration; and
receiving, from the first network entity, a response message including the time gap configuration,
wherein the time gap configuration is associated with a duration of a time gap.

3. The method of claim 1, further comprising:
releasing autonomously a connection with the first network entity through the first SIM in case that the UE determines to use the second network entity.

4. A user equipment (UE) comprising:
a plurality of subscriber identity modules (SIMs);
a memory; and
a processor, coupled with the memory, configured to:
receive, from a second network entity associated with a second SIM, a paging message when the UE is connected with a first network entity through a first SIM,
transmit, to the second network entity, a message in response to the paging message during a time gap configuration,
determine which network entity to use either the first network entity or the second network entity based on the paging message, and
receive, from the first network entity, a service associated with the first network entity in case that the UE determines to continue using the first network entity, or
receive, from the second network entity, a service associated with the second network entity in case that the UE determines to use the second network entity.

5. The UE of claim 4,
wherein the processor is further configured to:
transmit, to the first network entity, a request message to obtain the time gap configuration,
receive, from the first network entity, a response message including the time gap configuration, and
wherein the time gap configuration is associated with a duration of a time gap.

6. The UE of claim 4, wherein the processor is further configured to release autonomously a connection with the first network entity through the first SIM in case that the UE determines to use the second network entity.

* * * * *